US012746500B2

(12) United States Patent
Adamek et al.

(10) Patent No.: US 12,746,500 B2
(45) Date of Patent: Sep. 29, 2026

(54) FILTER MEDIA, FILTER MEDIA PACKS, AND FILTER ELEMENTS

(71) Applicant: DONALDSON COMPANY, INC., Minneapolis, MN (US)

(72) Inventors: Daniel E. Adamek, Bloomington, MN (US); Scott M. Brown, Faribault, MN (US); Mark A. Sala, Lino Lakes, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 15/839,633

(22) Filed: Dec. 12, 2017

(65) Prior Publication Data

US 2018/0161717 A1 Jun. 14, 2018

Related U.S. Application Data

(60) Provisional application No. 62/433,145, filed on Dec. 12, 2016.

(51) Int. Cl.

| | |
|---|---|
| ***B01D 53/22*** | (2006.01) |
| ***B01D 46/52*** | (2006.01) |
| *B01D 46/62* | (2022.01) |
| *F02M 35/024* | (2006.01) |

(52) U.S. Cl.

CPC ......... *B01D 46/526* (2013.01); *B01D 46/522* (2013.01); *B01D 46/527* (2013.01); *B01D 46/62* (2022.01); *F02M 35/0245* (2013.01)

(58) Field of Classification Search

CPC .............. B01D 46/527; B01D 46/0023; B01D 46/526; B01D 46/522; F02M 35/0245

See application file for complete search history.

(56) References Cited

U.S. PATENT DOCUMENTS

| | | | |
|---|---|---|---|
| 2,995,253 | A | 8/1961 | Leo et al. |
| 3,966,646 | A | 6/1976 | Holland et al. |
| 4,813,759 | A | 3/1989 | Chappell |
| 5,670,238 | A | 9/1997 | Earl et al. |
| 5,820,646 | A | 10/1998 | Gillingham et al. |
| 6,544,310 | B2 | 4/2003 | Badeau et al. |

(Continued)

FOREIGN PATENT DOCUMENTS

| | | |
|---|---|---|
| CN | 1822891 | 8/2006 |
| DE | 102013012193 | 3/2014 |

(Continued)

OTHER PUBLICATIONS

Machine Translation of WO2011138247 (Year: 2011).*

(Continued)

*Primary Examiner* — Anthony R Shumate

(74) *Attorney, Agent, or Firm* — Pauly, DeVries Smith & Deffner LLC

(57) ABSTRACT

Embodiments include an air filtration media pack comprising a plurality of layers of fluted media, each layer comprising a facing sheet and a fluted sheet, the fluted sheet comprising a first plurality of flutes and a second plurality of flutes, the first and second plurality of flutes being arranged in a parallel flow configuration; wherein the first and second plurality of flutes exhibit regular repeating differences in flute shape, flute size, flute height, flute width, cross-flute area, or filter media.

19 Claims, 30 Drawing Sheets

(56) References Cited

U.S. PATENT DOCUMENTS

| | | | | |
|---|---|---|---|---|
| 6,776,814 | B2 | 8/2004 | Badeau et al. | |
| 6,953,124 | B2 | 10/2005 | Winter et al. | |
| 6,986,804 | B2 | 1/2006 | Dominiak et al. | |
| 7,128,772 | B2 | 10/2006 | Brueck | |
| 7,537,633 | B2 | 5/2009 | Bardon | |
| 7,959,702 | B2 | 6/2011 | Rocklitz et al. | |
| 7,998,259 | B2 | 8/2011 | Vijayakumar | |
| 8,397,920 | B2 * | 3/2013 | Moy | B01D 25/001 210/493.1 |
| 8,460,442 | B2 | 6/2013 | Wagner et al. | |
| 8,545,590 | B2 | 10/2013 | Witsch et al. | |
| 8,702,830 | B2 | 4/2014 | Muter | |
| 8,888,885 | B2 | 11/2014 | Barreteau et al. | |
| 9,084,957 | B2 | 7/2015 | Rocklitz | |
| 9,108,394 | B2 | 8/2015 | Moe et al. | |
| 9,623,362 | B2 | 4/2017 | Brown | |
| 10,730,001 | B2 | 8/2020 | Tate et al. | |
| 11,596,893 | B2 | 3/2023 | Adamek et al. | |
| 2002/0090324 | A1 | 7/2002 | Badeau et al. | |
| 2002/0174770 | A1 | 11/2002 | Badeau et al. | |
| 2003/0121845 | A1 | 7/2003 | Wagner et al. | |
| 2004/0118771 | A1 | 6/2004 | Schukar et al. | |
| 2004/0187689 | A1 * | 9/2004 | Sporre | B01D 46/525 95/280 |
| 2004/0194440 | A1 | 10/2004 | Bruck et al. | |
| 2007/0261374 | A1 * | 11/2007 | Nelson | B01D 46/526 55/434 |
| 2008/0282890 | A1 | 11/2008 | Rocklitz et al. | |
| 2009/0127211 | A1 | 5/2009 | Rocklitz | |
| 2010/0032365 | A1 * | 2/2010 | Moe | B32B 37/1284 210/470 |
| 2010/0263337 | A1 * | 10/2010 | Raether | B01D 46/0005 55/294 |
| 2010/0263340 | A1 | 10/2010 | Komori et al. | |
| 2010/0326396 | A1 | 12/2010 | Patel et al. | |
| 2011/0041692 | A1 * | 2/2011 | Raether | B01D 46/4227 95/280 |
| 2011/0083559 | A1 * | 4/2011 | Raether | B01D 46/0005 95/273 |
| 2011/0113736 | A1 * | 5/2011 | Raether | B01D 46/2411 55/302 |
| 2012/0079798 | A1 | 4/2012 | Rafi et al. | |
| 2012/0110962 | A1 * | 5/2012 | Dewit | B01D 46/526 55/357 |
| 2012/0118814 | A1 | 5/2012 | Moy et al. | |
| 2012/0159909 | A1 | 6/2012 | Gieseke et al. | |
| 2013/0146526 | A1 | 6/2013 | Saito et al. | |
| 2013/0327218 | A1 | 12/2013 | Izzi et al. | |
| 2014/0208705 | A1 | 7/2014 | Krull | |
| 2014/0224127 | A1 | 8/2014 | Nagata et al. | |
| 2014/0325946 | A1 | 11/2014 | Rocklitz et al. | |
| 2015/0211452 | A1 * | 7/2015 | Brown | B01D 46/0023 55/482 |
| 2016/0016106 | A1 | 1/2016 | Bowerman et al. | |
| 2017/0197165 | A1 | 7/2017 | Schwartz et al. | |
| 2018/0307644 | A1 * | 10/2018 | Norton | G06F 13/4081 |
| 2018/0369735 | A1 | 12/2018 | Decoster et al. | |
| 2019/0374897 | A1 | 12/2019 | Adamek et al. | |
| 2023/0241542 | A1 | 8/2023 | Adamek et al. | |
| 2024/0359124 | A1 | 10/2024 | Adamek et al. | |

FOREIGN PATENT DOCUMENTS

| | | |
|---|---|---|
| JP | S50148271 | 11/1975 |
| JP | 2007021476 | 2/2007 |
| RU | 2066232 | 9/1996 |
| RU | 2438754 | 1/2012 |
| WO | 8701301 | 3/1987 |
| WO | 2011138247 | 11/2011 |
| WO | 2016014549 | 1/2016 |
| WO | 2016141097 | 9/2016 |
| WO | 2018111923 | 6/2018 |

OTHER PUBLICATIONS

Https://richbeveridge.wordpress.com/2009/10/23/area-under-a-parabola/#:~:text=So%2C%20the%20formula%20indicates%20that,horizontal%20line%20to%20the%20vertex. Area Under a Parabola Oct. 23, 2009 by richbeveridge (Year: 2009).*

Https://www.thefreedictionary.com/filter 1 page, Random House Kernerman Webster's College Dictionary, 2010 K Dictionaries Ltd. Random House, Inc. (Year: 2010).*

International Preliminary Report on Patentability for PCT Application No. PCT/US2017/065889 mailed Jun. 27, 2019 (10 pages).

International Search Report and Written Opinion for PCT Application No. PCT/US2019/036601 mailed Aug. 28, 2019 (20 pages).

International Search Report and Written Opinion for PCT Application No. PCT/US2017/065889 mailed Mar. 9, 2018 (14 pages).

First Office Action for CN Patent Application No. 201780075528.7 mailed Jan. 5, 2021 (17 pages).

International Preliminary Report on Patentability for PCT Application No. PCT/US2019/036601 mailed Dec. 24, 2020 (12 pages).

Office Action for Russian Patent Application No. 2019118897 mailed Nov. 23, 2020 (10 pages) with English Translation.

"Non-Final Office Action," for U.S. Appl. No. 16/438,183 mailed Apr. 19, 2021 (29 pages).

"Final Office Action," for U.S. Appl. No. 16/438,183 mailed Sep. 14, 2021 (21 pages).

"First Examination Report," for Indian Patent Application No. 201918020882 mailed May 17, 2021 (6 pages).

"Response to Non-Final Rejection," mailed on Apr. 19, 2021 for U.S. Appl. No. 16/438,183, submitted via EFS-Web on Jul. 19, 2021, 15 pages.

"Second Office Action," for Chinese Patent Application No. 201780075528.7 mailed Aug. 25, 2021 (17 pages) with English Translation.

"Office Action," for Japanese Patent Application No. 2019-528844 mailed Sep. 24, 2021 (14 pages) with English Translation.

"Response to Final Rejection," mailed on Sep. 14, 2021 for U.S. Appl. No. 16/438,183, submitted via EFS-Web on Nov. 15, 2021, 12 pages.

"Communication Pursuant to Article 94(3) EPC," for European Patent Application No. 19734590.3 mailed Oct. 7, 2021 (6 pages).

"First Office Action," for Chinese Patent Application No. 201880038251.X mailed Dec. 29, 2021 (22 pages) with English Translation.

"Non-Final Office Action," for U.S. Appl. No. 16/438,183 mailed Jan. 25, 2022 (22 pages).

"Final Office Action," for Japanese Patent Application No. 2020-564354 mailed Dec. 4, 2023 (6 pages) with English translation.

"First Office Action," for Chinese Patent Application No. 202210671509.3 mailed Dec. 20, 2023 (14 pages) with English translation.

"Notice of Allowance," for U.S. Appl. No. 18/101,909 mailed Jan. 18, 2024 (16 pages).

"Office Action," for Mexican Patent Application No. 2019006625 mailed Jan. 23, 2024 with English translation (10 pages).

"Response to Non-Final Rejection," mailed on Sep. 20, 2023, for U.S. Appl. No. 18/101,909, submitted via EFS-Web on Dec. 20, 2023, 14 pages.

"Notice of Allowance," for U.S. Appl. No. 16/438,183 mailed Oct. 24, 2022 (14 pages).

"Reconsideration Report by Examiner before Appeal", for Japanese Patent Application No. 2019-528844 mailed Oct. 25, 2022 (4 pages) with English Translation.

"Communication Pursuant to Article 94(3) EPC," for European Patent Application No. 19734590.3 mailed Feb. 20, 2023 (7 pages).

"Office Action," for Brazilian Patent Application No. 112019011544-7 dated May 9, 2023 (9 pages).

"Office Action," for Japanese Patent Application No. 2020-564354 mailed Jun. 26, 2023 (8 pages) with English Translation.

"Office Action," for Mexican Patent Application No. MX/a/2019/006625 mailed May 23, 2023 (7 pages) with English summary.

"Non-Final Office Action," for U.S. Appl. No. 18/101,909 mailed Sep. 20, 2023 (21 pages).

(56) References Cited

OTHER PUBLICATIONS

"Office Action," for Mexican Patent Application No. 2019006625 mailed Oct. 3, 2023 (12 pages) with English Summary.
"Communication Pursuant to Article 94(3) EPC," for European Patent Application No. 17822952.2 mailed Jun. 21, 2022 (7 pages).
"Final Office Action," for Japanese Patent Application No. 2019-528844 mailed May 6, 2022 (6 pages) with English Translation.
"Final Office Action," for U.S. Appl. No. 16/438,183 mailed Jul. 1, 2022 (24 pages).
"First Examination Report," for Indian Patent Application No. 202017048767 mailed Jul. 8, 2022 (7 pages).
"Response to Final Rejection," mailed on Jul. 1, 2022 for U.S. Appl. No. 16/438,183, submitted via EFS-Web on Sep. 30, 2022, 14 pages.
"Response to Non-Final Rejection," mailed on Jan. 25, 2022 for U.S. Appl. No. 16/438,183, submitted via EFS-Web on Apr. 25, 2022, 12 pages.
"Second Office Action," for Chinese Patent Application No. 201980038251.X mailed Jul. 5, 2022 (20 pages) with English Translation.
"Office Action," for Mexican Patent Application No. MX/a/2019/006625 mailed Jan. 6, 2023 (7 pages) with English Summary.
"Final Rejection," for Chinese Patent Application No. 202210671509.3 mailed Nov. 15, 2024 (10 pages) with English translation.
"First Office Action," for Japanese Patent Application No. 2023-173816 mailed Dec. 13, 2024 (6 pages) with English translation.
"Extended European Search Report," for European Patent Application No. 25174245.8 mailed Oct. 23, 2025 (11 pages).
"Second Office Action," for Japanese Patent Application No. 2023-173816 mailed May 19, 2025 (8 pages) with English translation.
"Office Action," for Brazilian Patent Application No. 112020024980-7 dated Dec. 23, 2025 (8 pages) with English translation.

* cited by examiner

Loading Curve for Various Media

FILTER MEDIA, FILTER MEDIA PACKS, AND FILTER ELEMENTS

This application is a non-provisional application claiming priority to U.S. Provisional Application No. 62/433,145, filed on Dec. 12, 2016, and the entire contents of which is incorporated herein by reference.

FIELD

Embodiments herein relate to filter media, filter media packs, filter elements, air cleaners, and methods of making and using filter media, media packs, elements and air cleaners. More specifically, embodiments herein relate to z-flow filter media, media packs, and filter elements.

BACKGROUND

Z-flow filter media, such as that described in U.S. Pat. No. 7,959,702 to inventor Rocklitz, has a plurality of layers of media. Each layer has a fluted sheet, a facing sheet, and a plurality of flutes extending from a first face to a second face of the filtration media pack. A first portion of the plurality of flutes are closed to unfiltered air flowing into the first portion of the plurality of flutes, and a second portion of the plurality of flutes are closed to unfiltered air from flowing out of the second portion of the plurality of flutes. Air passing into flutes on one face of the media pack passes through filter media before flowing out flutes on the other face of the media pack.

Although z-flow media has many benefits, a need remains for improved filter performance, including filter media, media packs, and elements with reduced pressure loss across the element and/or improved particulate loading capacity.

SUMMARY

The present application relates to filter media, filter media packs, filter elements, and air cleaners with two or more different media configurations, plus methods of making and using the media, media packs, filter elements, and air cleaners. The different media configurations can be, for example, different flute geometries in a z-flow filter media. The use of two or more different media configurations allows for improved performance, such as reduced pressure loss and/or increased loading capacity, relative to the use of a single media configuration.

In example implementations two different media sections are combined into a single filter element, the two media sections having distinct pressure loss and loading properties. The distinction in pressure loss and loading properties between the media sections will generally be less than normal variation observed within filter elements from manufacturing variations, thus generally the difference will be at least 5 percent for a specific measured and varied parameter, and more typically at least 10 percent for a specific measured and varied parameter.

In an example configuration the first media section has a lower initial pressure loss than the second media section, while the second media section has a greater dust holding capacity than the first media section. In certain constructions the combination of these two media sections results in an element that has better performance than would be achieved with a media pack made only of one of these media alone, and better than would be achieved by just averaging the performance of each media sections. Thus, the hybrid filter element can (for example) demonstrate reduced initial pressure loss but also increased loading relative to media packs made with just one media or the other media.

Flute height, for example, can be varied so that individual layers of media have varied height, multiple layers of media have different heights, or larger sections of media have different heights.

Flow through these various layers and sections of media is typically a parallel flow. As used herein, the term "parallel" refers to a construction in which a fluid stream to be filtered diverges into the first and second plurality of flutes, and then typically converges again later. As such, "parallel" does not require that the flutes themselves be arranged in a geometrically parallel configuration (although they often are), but rather that the pluralities of flutes exhibit parallel flow with regard to one another. Thus, "parallel" flow is used in contrast to "serial" flow (where the flow is from one plurality of flutes and then into a second plurality of flutes in serial flow).

Constructions made in accordance with the disclosures herein can, for example, allow for improvements in both pressure loss and dust loading relative to filter media packs and elements that are made of a single media type. In addition, in some implementations it is possible to add more media into a prescribed volume without significantly increasing initial pressure loss. As such, a media construction can be created that has a relatively low initial pressure loss while still having a relatively high dust loading capacity. This improvement can be obtained by combining a first media that has a low initial pressure loss (but low dust loading capacity) with a second media that has a higher initial pressure loss (and higher dust loading capacity). The resulting combined media demonstrates, in some embodiments, an initial pressure loss similar to the first media but with the dust loading of the second media.

It is also possible to utilize the benefits of the hybrid media constructions to get more media in a specific volume, as well as to load more dust on a given media surface area. Thus, it is possible to get improved media performance while having less media.

In example constructions the first media pack can comprise, for example, approximately 10, 20, 30, 40, 50, 60, 70, 80, or 90 percent of the media pack (measured by pack volume); and the second media pack can comprise, for example, approximately 10, 20, 30, 40, 50, 60, 70, 80 or 90 percent of the media pack (measured by pack volume). As used herein, pack volume means the total volume occupied by the media pack when measuring that area contained within the perimeter of the pack. Thus, pack volume can include the media itself, as well as the open upstream volume into which dust can load and the downstream volume through which the filtered air travels out of the media pack. Alternatively, the first plurality of flutes comprises from 20 to 40 percent of the pack volume, and the second plurality of flutes comprises from 60 to 80 percent of the pack volume. In other implementations the first plurality of flutes comprises from 40 to 60 percent of the pack volume, and the second plurality of flutes comprises from 60 to 40 percent of the pack volume. In yet another implementation the first plurality of flutes comprises from 60 to 90 percent of the inlet face of the media pack, and the second plurality of flutes comprises from 40 to 10 percent of the pack volume.

In such example constructions the first media pack can be, for example, approximately 10, 20, 30, 40, 50, 60, 70, 80, or 90 percent of the media pack (measured by media surface area); and the second media can be, for example, approximately 10, 20, 30, 40, 50, 60, 70, 80 or 90 percent of the media pack (measured by media surface area). As used herein, pack surface area means the total surface area of the media in each media pack if the media pack was taken apart and the media stretched out. Alternatively, the first plurality of flutes comprises from 20 to 40 percent of the media surface area, and the second plurality of flutes comprises from 60 to 80 percent of the media surface area. In other implementations the first plurality of flutes comprises from 40 to 60 percent of the inlet face of media surface area, and the second plurality of flutes comprises from 60 to 40 percent of the media surface area pack. In yet another implementation the first plurality of flutes comprises from 60 to 90 percent of the media surface area, and the second plurality of flutes comprises from 40 to 10 percent of the media surface area. It is also possible to characterize media packs by the portion of the inlet face occupied by a specific media type. In some implementations the first media pack (comprising a first plurality of flutes) comprises from 10 to 90 percent of the inlet face of the media pack, such as 10, 20, 30, 40, 50, 60, 70, 80 or 90 percent of the inlet face of the media pack; and the second media pack (comprising a second plurality of flutes) comprises from 90 to 10 percent of the inlet face of the media pack, such as 90, 80, 70, 60, 50, 40, 30, 20 or 10 percent of the inlet face of the media pack. Alternatively, the first plurality of flutes comprises from 20 to 40 percent of the inlet face of the media pack, and the second plurality of flutes comprises from 60 to 80 percent of the inlet face of the media pack. In other implementations the first plurality of flutes comprises from 40 to 60 percent of the inlet face of the media pack, and the second plurality of flutes comprises from 60 to 40 percent of the inlet face of the media pack. In yet another implementation the first plurality of flutes comprises from 60 to 90 percent of the inlet face of the media pack, and the second plurality of flutes comprises from 40 to 10 percent of the inlet face of the media pack.

Another embodiment of the filtration media pack includes a third plurality of flutes arranged in parallel flow with the first and second plurality of flutes; wherein the first, second, and third plurality of flutes exhibit regular repeating differences in flute shape, flute size, flute height, flute width, cross-flute area, or filter media. Optionally each of the first, second, and third pluralities of flutes is arranged in a separate plurality of layers. It will be understood that in some implementations more than three pluralities of flutes arranged in parallel flow, wherein each of the plurality of flutes exhibit differences in flute shape, flute size, flute height, flute width, cross-flute area, or filter media. Frequently these differences in flute properties are repeating, often regularly repeating.

In an example construction having three types of flutes, the first, second, and third flutes can be selected such that the first plurality of flutes comprises 20 to 50 percent of the volume of the media pack, such as 20, 30, 40, or 50 percent the volume of media pack; the second plurality of flutes comprises 20 to 50 percent the volume of the pack, such as 20, 30, 40 or 50 percent of the volume of media pack; and the third plurality of flutes comprises 20 to 50 percent of the volume of the media pack, such as 20, 30, 40 or 50 percent of the volume of the media pack.

In an example construction having three types of flutes, the first, second, and third flutes can be selected such that the first plurality of flutes comprises 20 to 50 percent of the media surface area of the media pack, such as 20, 30, 40, or 50 percent of the media surface area of the filter media pack; the second plurality of flutes comprises 20 to 50 percent of the media surface area of the media pack, such as 20, 30, 40 or 50 percent of the media surface area of the media pack; and the third plurality of flutes comprises 20 to 50 percent of the media surface area of the media pack, such as 20, 30, 40 or 50 percent of the surface area of the media pack.

In an example construction having three types of flutes, the first, second, and third flutes can be selected such that the first plurality of flutes comprises 20 to 50 percent of the inlet face of the media pack, such as 20, 30, 40, or 50 percent of the inlet face of the filter media pack; the second plurality of flutes comprises 20 to 50 percent of the inlet face of the media pack, such as 20, 30, 40 or 50 percent of the inlet face of the filter media pack; and the third plurality of flutes comprises 20 to 50 percent of inlet face of the media pack, such as 20, 30, 40 or 50 percent of the inlet face of the media pack.

An example air filtration media pack has a plurality of layers of fluted z-flow media. In some constructions each layer of media has a facing sheet and a fluted sheet. Each fluted sheet includes a plurality of flutes which exhibit regular repeating differences in flute shape, flute size, flute height, flute width, cross-flute area, or filter media. These pluralities of flutes are arranged and a parallel flow pattern. The facing sheet can be, for example, constructed of the same material forming the fluted sheet, or can be constructed of a different material. The facing sheet is typically not fluted, but can be fluted in some constructions. The facing sheet can possess filtration properties, or be a non-filtration material without filtration properties (such as a spacer material). Also, the facing sheet can cover all or only a portion of each fluted sheet. The facing sheet can be continuous or segmented such that separate facing sheet segments are positioned against each facing sheet.

The different media types in the plurality of flutes are in parallel flow to one another. As noted above, as used herein the term "parallel" refers to a construction in which a fluid stream to be filters diverges into the first and second plurality of flutes, and then typically converges again later. As such, "parallel" does not require that the flutes themselves be arranged in a geometrically parallel configuration (although they often are), but rather that the pluralities of flutes have generally parallel flow with regard to one another. Thus, "parallel" flow is used in contrast to "serial" flow where the flow is from one plurality of flutes and then into a second plurality of flutes. It will be understood that, in some constructions such as a wrapped construction, the fluid flow may be between adjacent sections of filter media.

The media can be arranged within a media pack in a variety of constructions, including alternating single face layers (for example, construction A/B/C/A/B/C . . . where A, B, and C each refer to distinct flute types, and "/" denotes separate layers. Thus, A/B/C/A/B/C . . . refers to a fluted media with a first layer of flutes having configuration A, followed by second layer of flutes having configuration B, and third layer of flutes having configuration C. This order is repeated for layers four, five and six in the A/B/C/A/B/C arrangement. This A/B/C arrangement can be repeated numerous times to create the full media pack.

The use of the terms "A", "B", and "C" flutes is meant to represent medias with different properties. For example, flutes of type A may have a greater height than flutes of type B or type C; or flutes of type B may have a greater or lesser width than flutes of type A or type C; or flutes of type A can be formed of media with greater efficiency and/or permeability than flutes of type B or C.

It will also be understood that the media can be arranged in constructions where layers of similar flutes are grouped together, such as a media pack with the construction A/A/

A/A/B/B/B/C/C/C. In this construction there are four layers with A flutes, three layers with B flutes, and three layers with C flutes. Each of the layers with types of flutes A, B, and C are grouped together. The different media areas containing different types of flutes can directly contact one another, such as by being arranged in a stacked or wrap configuration. They also be arranged so that the different media areas are separated by a divider or other component.

It will also be understood that there can be many more than three or four layers of similar flutes grouped together depending upon flute size, media pack size, etc. A media pack may be constructed with many layers of each media, such as (for example), ten, twenty, thirty or forty grouped layers A flutes; or ten, twenty, thirty or forty grouped layers of B flutes, etc.

In some constructions flutes can be varied repeatedly within a layer as well as between layers. For example, a media pack having the construction ABC . . . /DEF . . . /ABC . . . /DEF . . . /ABC . . . /DEF . . . has layers with repeating flutes A, flutes B and flutes C alternating with layers having flutes D, flutes E, and flutes F. Other examples, without limitation, include a media pack with AB . . . /CDEF . . . /AB . . . /CDEF; a media pack with A . . . /BCD . . . /A . . . /BCD . . . .

Using more than one flute configuration within a given filter media pack or air cleaner can provide various benefits, including having a lower initial restriction of one flute configuration and the dust holding capacity of a second flute configuration. Thus, elements formed of the combined media can outperform elements formed solely of one flute configuration. In this manner combining different types and styles of flute geometries allows improvements in one or more of cost, initial pressure loss, loading capacity, or other aspects of filter performance.

In some constructions the relative position of the media is determined by desired element properties. For example, higher permeability media can be arranged in areas of a filter element that has highest face velocity due to configuration of an air cleaner in which it is placed so as to reduce initial restriction. In other embodiments, higher efficiency media is arranged in areas with the highest face velocity to improve initial efficiency of the filter element.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures, in which.

Figure 1:
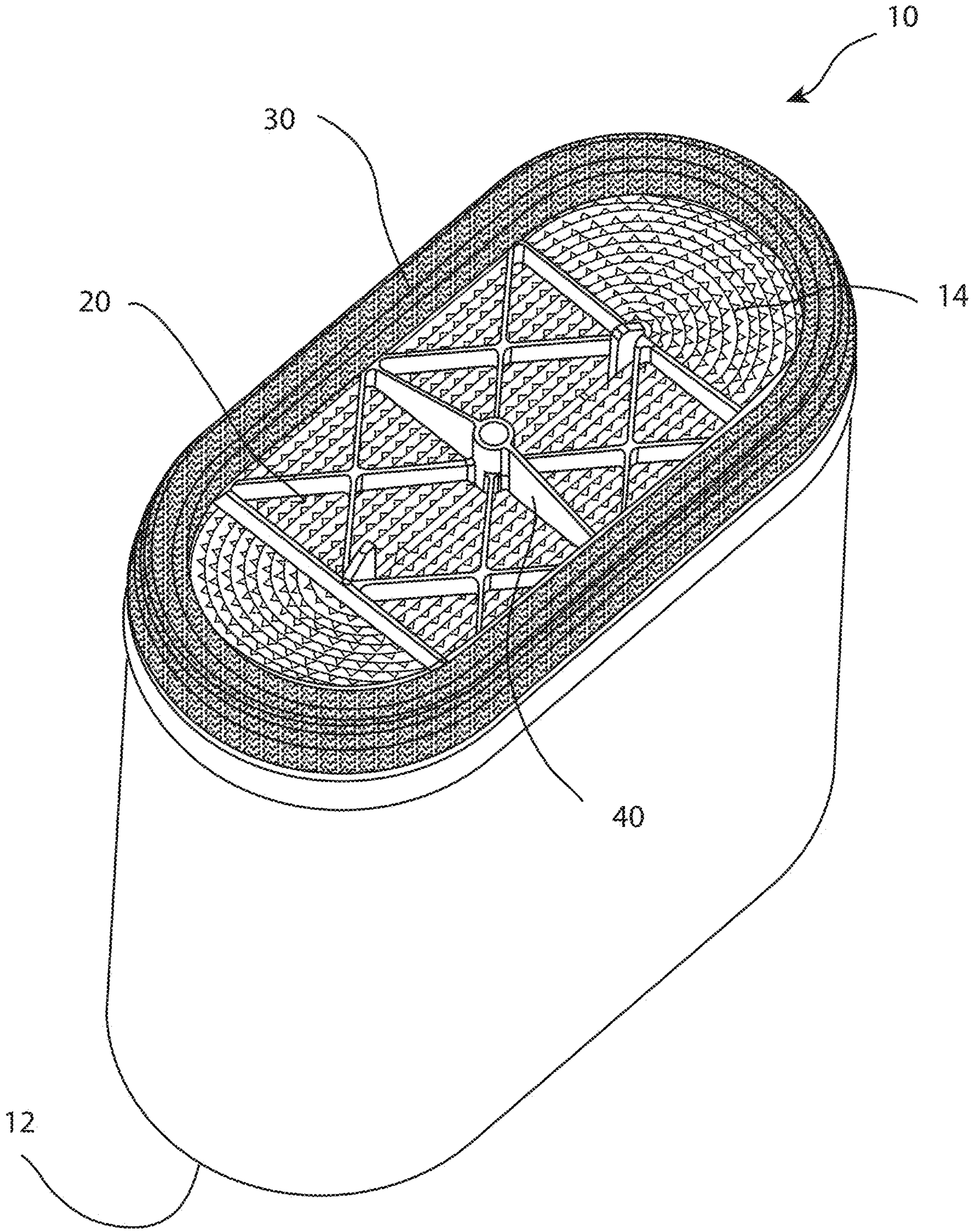
FIG. 1 is perspective view of an example filter element made in accordance with example embodiment.

While embodiments are susceptible to various modifications and alternative forms, specifics thereof have been shown by way of example and drawings, and will be described in detail. It should be understood, however, that the scope herein is not limited to the embodiments described. On the contrary, the intention is to cover modifications, equivalents, and alternatives falling within the spirit and scope herein.

DETAILED DESCRIPTION

The present application is directed, in an example embodiment, to an air filtration media pack comprising a plurality of layers of fluted media, each layer comprising a first plurality of flutes and a second plurality of flutes, the first and second plurality of flutes being arranged in a parallel flow configuration; wherein the first and second plurality of flutes exhibit differences in flute shape, flute size, flute height, flute width, cross-flute area, or filter media.

These pluralities of flutes are arranged in parallel flow. As noted above, as used in this context, the term "parallel" refers to a construction in which a fluid stream to be filtered diverges into the first and second plurality of flutes, and then typically converges again later. As such, "parallel" does not require that the flutes themselves be arranged in a geometrically parallel configuration (although they often are), but rather that the pluralities of flutes exhibit parallel flow with regard to one another. Thus, "parallel" flow is used in contrast to "serial" flow (where the flow is from one plurality of flutes and then into a second plurality of flutes in serial flow).

In some implementations filtration media pack can be constructed so that the first and second plurality of flutes are arranged together within at least one layer of the fluted media. In other implementations the first plurality of flutes is arranged in a first plurality of layers, and the second plurality of flutes is arranged in a second plurality of layers of the fluted media. These two constructions can also be combined so that individual layers have repeating differences among the flutes, and that different layers are combined.

In example implementations two different media packs are combined into a single filter element, the two media packs having distinct pressure loss and loading properties. In an example the first media pack has a lower initial pressure loss than the second media pack, while the second media pack has a greater dust holding capacity than the first media pack. In certain constructions the combination of these two media results in an element that has better performance than would be achieved with either media alone, and better than would be achieved by just averaging the performance of each media pack. Thus, the hybrid filter element can (for example) demonstrate reduced initial pressure flow but also increased loading.

In example constructions the first media pack can be, for example, approximately 20, 30, 40, or 50 percent of the media pack (measured by pack volume); and the second media pack can be, for example, approximately 20, 30, 40, or 50 percent of the media pack (measured by pack volume). As used herein, pack volume means the total volume occupied by the media pack when measuring that area contained within the perimeter of the pack. Thus, pack volume can include the media itself, as well as the open volume into which dust can load.

In such example constructions the first media pack can be, for example, approximately 20, 30, 40, or 50 percent of the media pack (measured by media surface area); and the second media pack can be, for example, approximately 20, 30, 40, or 50 percent of the media pack (measured by media surface area). As used herein, pack surface area means the total surface area of the media in each media pack if the media pack was taken apart and the media stretched out.

In some implementations the first plurality of flutes comprises from 10 to 90 percent of the inlet face of the media pack, and the second plurality of flutes comprises from 90 to 10 percent of the inlet face of the media pack. Alternatively, the first plurality of flutes comprises from 20 to 40 percent of the inlet face of the media pack, and the second plurality of flutes comprises from 60 to 80 percent of the inlet face of the media pack. In other implementations the first plurality of flutes comprises from 40 to 60 percent of the inlet face of the media pack, and the second plurality of flutes comprises from 60 to 40 percent of the inlet face of the media pack. In yet another implementation the first plurality of flutes comprises from 60 to 90 percent of the inlet face of the media pack, and the second plurality of flutes comprises from 40 to 10 percent of the inlet face of the media pack.

Another embodiment of the filtration media pack includes a third plurality of flutes arranged in parallel flow with the first and second plurality of flutes; wherein the first, second, and third plurality of flutes exhibit regular repeating differences in flute shape, flute size, flute height, flute width, cross-flute area, or filter media. Optionally each of the first, second, and third pluralities of flutes is arranged in a separate plurality of layers. It will be understood that in some implementations more than three pluralities of flutes arranged in parallel flow, wherein each of the plurality of flutes exhibit regular repeating differences in flute shape, flute size, flute height, flute width, cross-flute area, or filter media.

In an example construction having three types of flutes, the first, second, and third flutes can be selected such that the first plurality of flutes comprises 30 to 50 percent of the inlet face of the media pack; the second plurality of flutes comprises 20 to 40 percent of the inlet face of the media pack; and the third plurality of flutes comprises 20 to 40 percent of inlet face of the media pack.

In another example construction having three types of flutes, the first, second, and third flutes can be selected such that the first plurality of flutes comprises 50 to 70 percent of the inlet face of the media pack; the second plurality of flutes comprises 10 to 30 percent of the inlet face of the media pack; and the third plurality of flutes comprises 10 to 30 percent of inlet face of the media pack.

In come implementations the plurality of layers of single facer media are arranged in a wound configuration, while in other implementations the facer media is arranged in a stacked configuration.

In some configurations the first and second plurality of layers of single facer media are arranged in an intermixed configuration with one more layers of the first plurality of single facer media alternating with one or more layers of the second plurality of single facer. In example implementations with at least three kinds of sing facer media, the first and second plurality of layers of single facer media are arranged in an intermixed configuration with one more layers of the first plurality of single facer media alternating with one or more layers of the second plurality of single facer media and one or more layers of the third plurality of single facer media. Also, when three types of media are used, the first, second, and third plurality of layers of single facer media can be arranged in an intermixed configuration with one more layers of the first plurality of single facer media alternating with one or more layers of the second plurality of single facer media and one or more layers of the third plurality of single facer media. In some implementations, more than three types of filter media are used, and these different types of media can be incorporated either in an intermixed manner or a manner in an aggregated manner in which the different types of media are collected together without intermixing between types of media. Alternatively, the media can be aggregated into smaller groups and then intermixed, such as by having five layers of one media and three layers of a different media.

Now, in reference to the drawings, further aspects of the filter media, media packs, and elements will be identified.

First, regarding FIG. 1, a perspective view of an example filter element 10 is shown. The example filter element 10 includes an inlet 12, an outlet 14 on the opposite side of the element 10 from the inlet 12, and wound z-flow media 20 within the element 10. A seal 30 is shown surrounding the inlet 12, and a support frame 40 is depicted. It will be appreciated as well that the filtration element can have flow opposite to that shown in FIG. 1, such that the inlet 12 and outlet 14 are reversed.

Figure 2A:
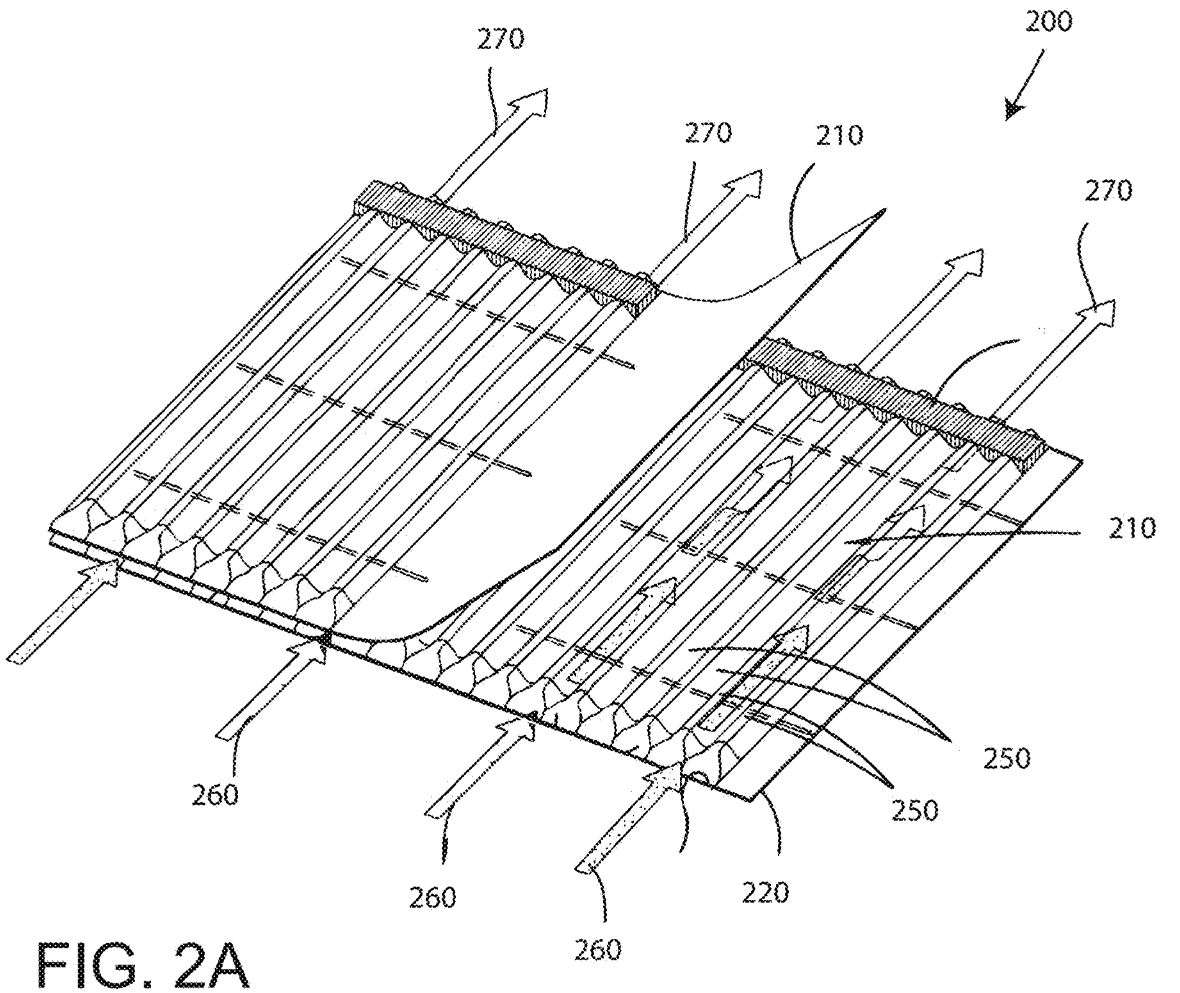
FIG. 2A is an enlarged schematic, cross-sectional view of a section of filter media.

FIG. 2A is an enlarged schematic, cross-sectional view of a section of single facer filter media 200 suitable for use in filter media packs and filter elements as described herein. The single facer media 200 includes fluted sheet 210, along with a top facer sheet 220 and a bottom facer sheet 230. The fluted sheet 210 includes a plurality of flutes 250. A fluid stream to be filtered, such as air for an internal combustion engine, enters flutes 250 along flow path 260, and then travels along the flutes until passing through the filter media and out a different flute along fluid flow path 270. This fluid flow through fluted media packs is described in, for example, U.S. Pat. No. 7,959,702 to Rocklitz, incorporated herein by reference in its entirety.

Figure 2B:
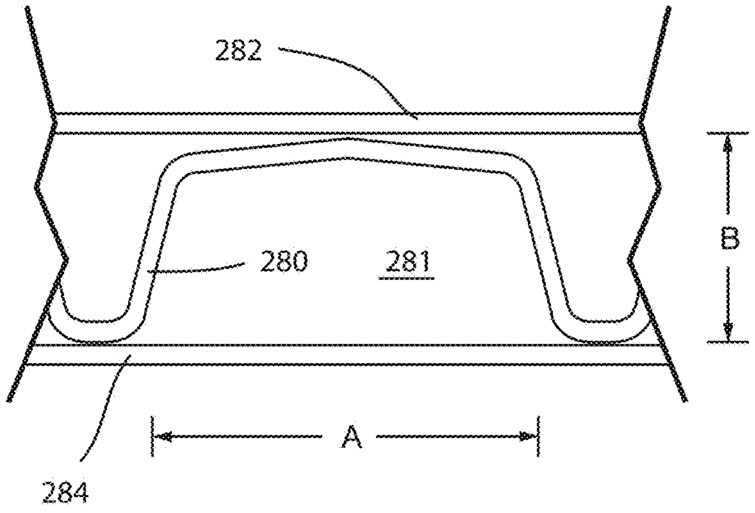
FIG. 2B is a partial, enlarged cross-sectional view of a sheet of fluted media along with top and bottom facing sheets.

FIG. 2B is an enlarged front view of a sheet of fluted media with a fluted sheet 280, top facer sheet 282 and facer media 284 constructed and arranged according to an embodiment of the invention is shown with dimensions of example flutes. The fluted sheet 280 includes flutes 281. The flutes 281 in the depicted embodiment have a width A measured from a first one peak to adjacent peak. In example embodiments width A is from 0.75 to 0.125 inches, optionally from 0.5 to 0.25 inches, and optionally from 0.45 to 0.3 inches. The flutes 281 also have a height B measured from adjacent same size peaks. The flute 281 has an area between fluted sheet 281 and facing sheet 282, measured perpendicular to the flute length. The area can vary depending along the length of the flute when the height, width or shape of the flute varies along its length, such as when the flute tapers.

Figure 3:
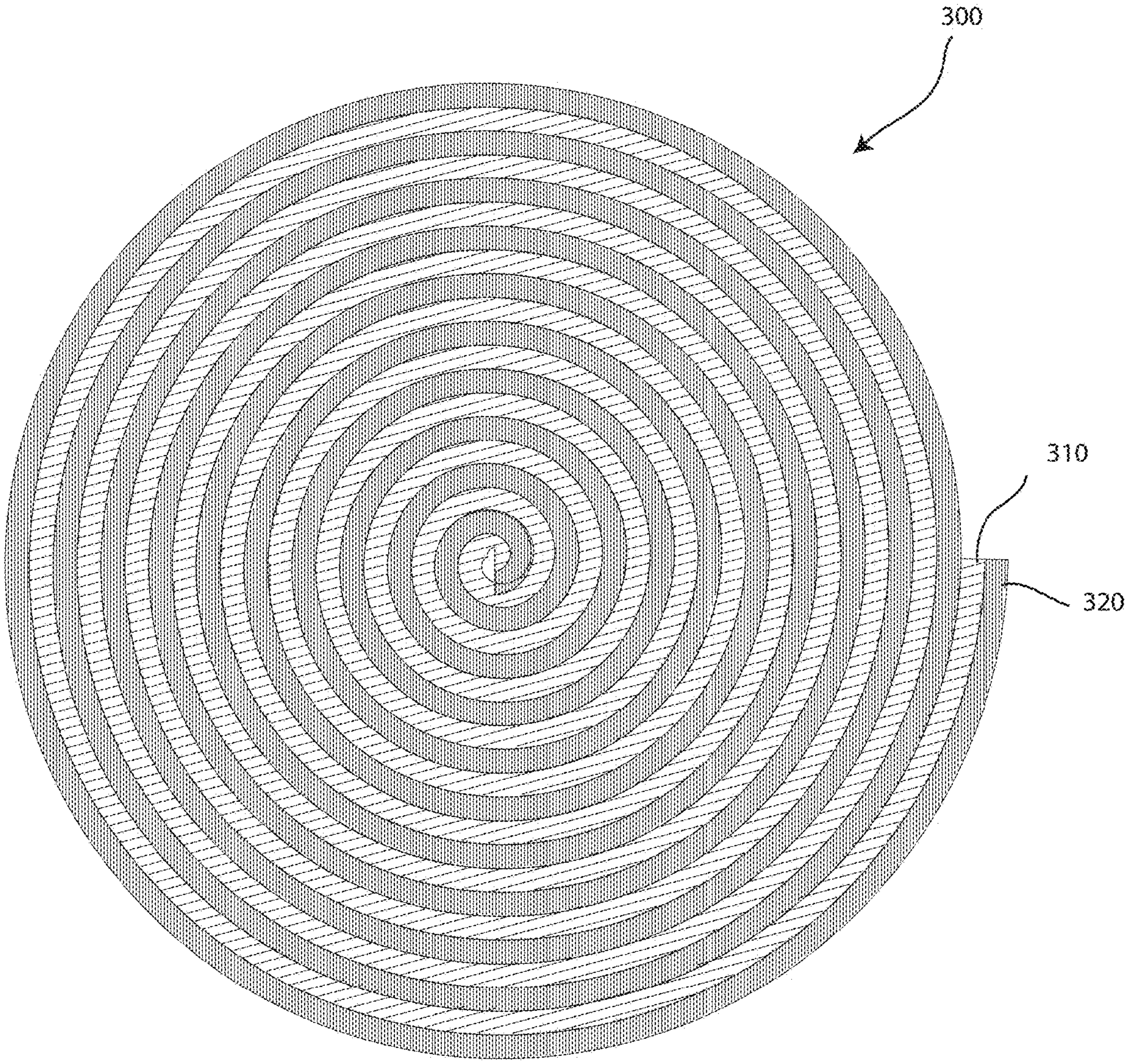
FIG. 3 is a top schematic view of an example filter media pack, showing a wound configuration with two types of filter media.

FIG. 3 is a top schematic view of an example filter media pack 300 for use in a filter element. The filter media pack 300 has two types of filter media: first media 310 and second media 320. The media is shown in a wound configuration with the two types of filter media intermixed and overlapping. The filter media 310 and 320 is shown in schematic form, without showing the actual flutes of the media. The filter media pack 300 can typically be formed by winding of different types of media simultaneously around a central axis. In this example embodiment the ratio of face area of media 310 to 320 is approximately 1:1.

Figure 4:
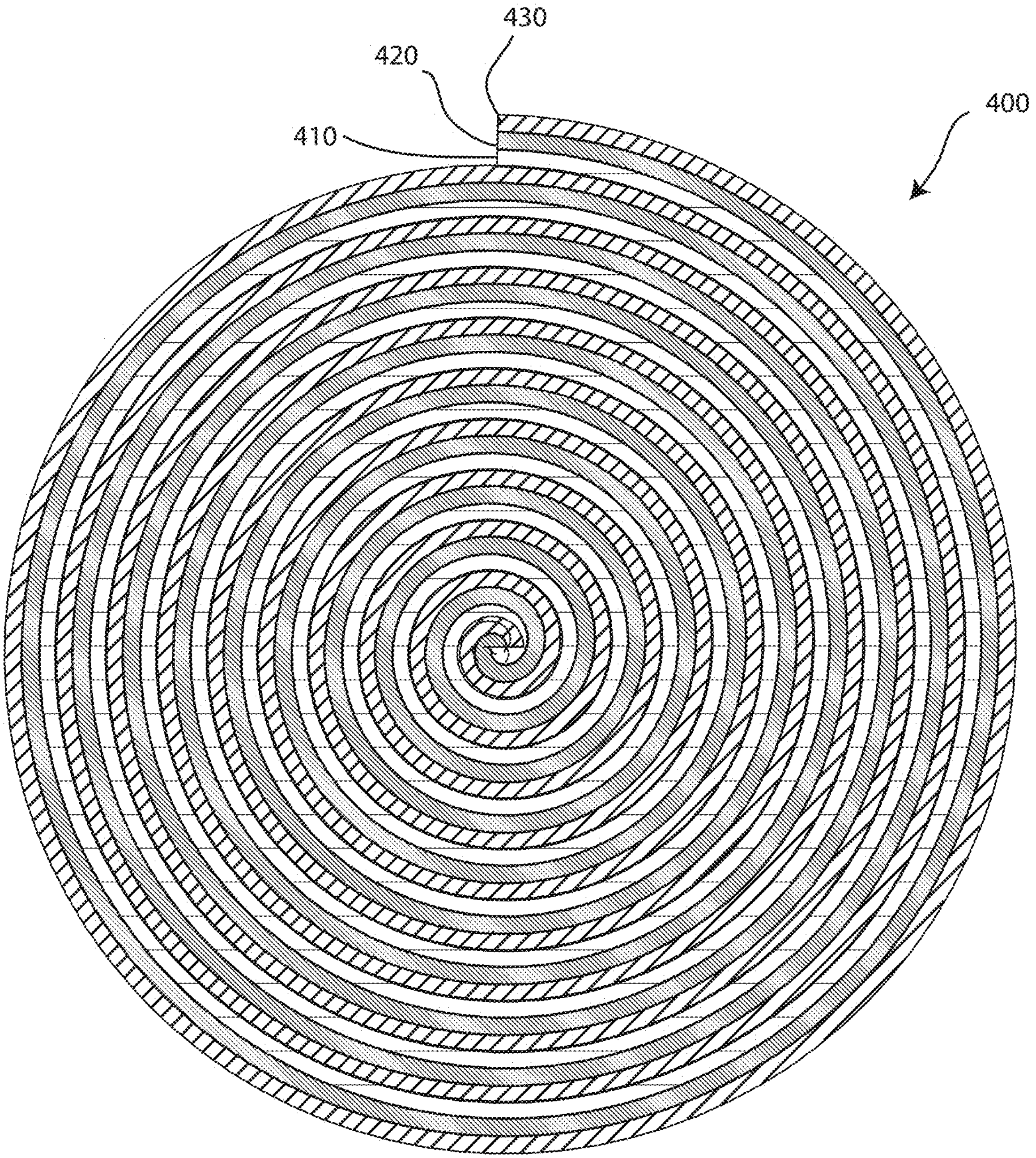
FIG. 4 is a top schematic view of an example filter media pack, showing a wound configuration with three types of filter media.

FIG. 4 is a top schematic view of an example filter media pack 400, showing a wound configuration with three types of filter media. The filter media pack 400 has three types of filter media: first media 410, a second media 420, and a third media 430. The media is shown in wound configuration with the three types of filter media intermixed and overlapping. The filter media 410, 420 and 430 is shown in schematic form, without showing the actual flutes of the media. The filter media pack 430 can typically be formed by winding three different types of media simultaneously around a central axis. In this example embodiment the ratio of face area of media 410 to 420 to 430 is approximately 1:1:1.

Figure 5:
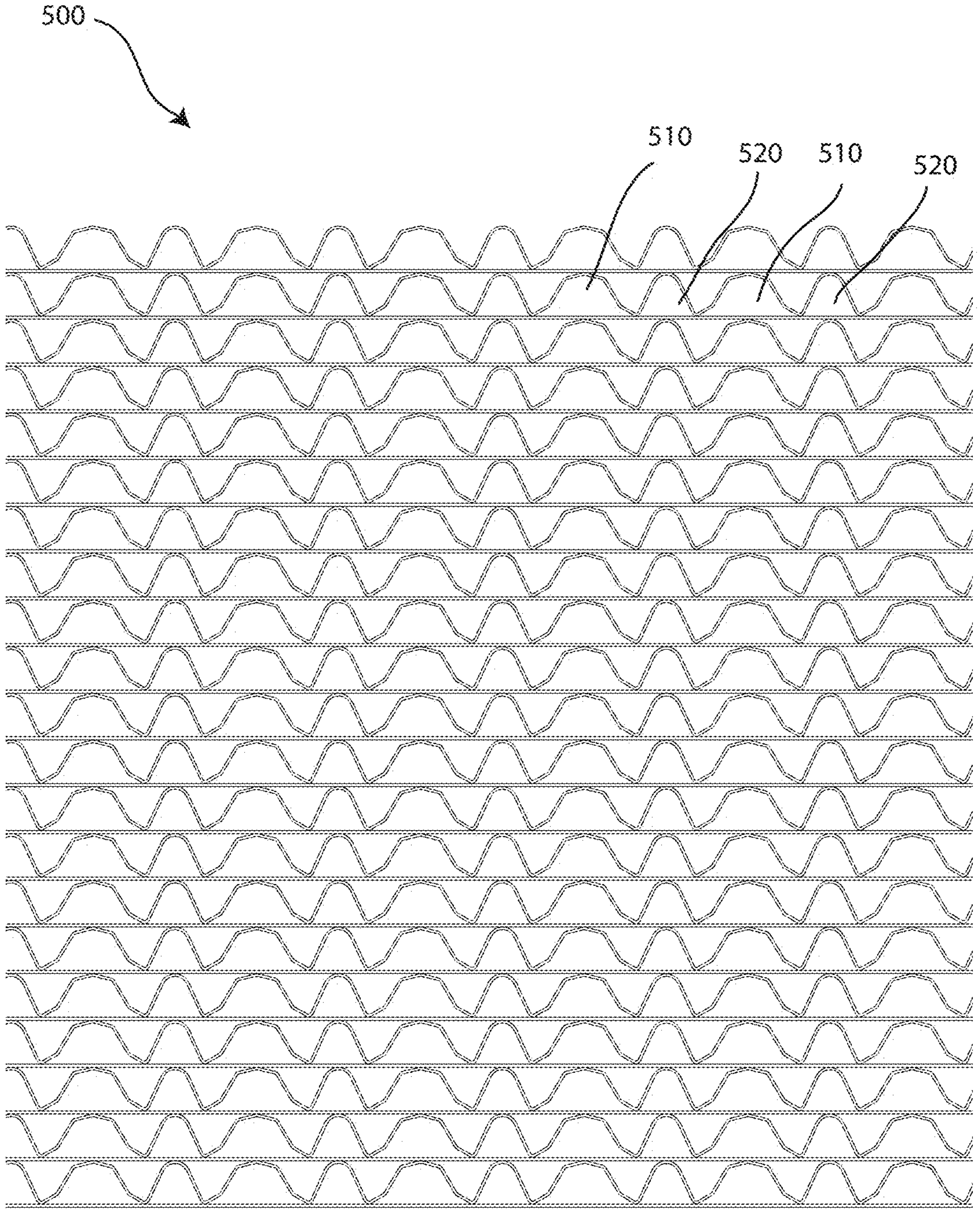
FIG. 5 is a top schematic view of an example filter media pack, showing a stacked configuration of filter media.

FIG. 5 is a top schematic view of an example filter media pack 500, showing a stacked configuration with two types of flutes. The filter media pack 500 has two types of flutes: first flutes 510 and second flutes 520.

Figure 6:
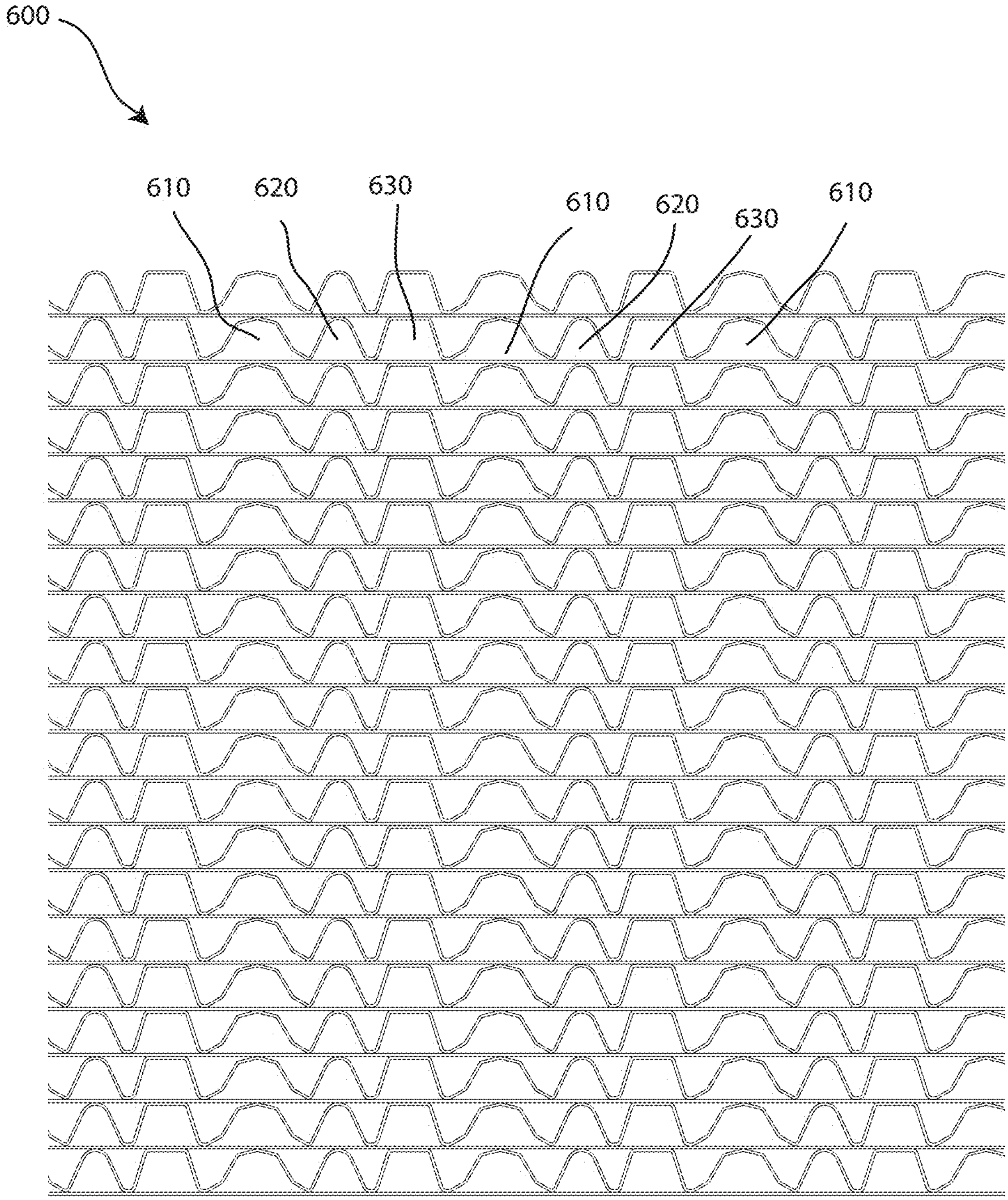
FIG. 6 is a top schematic view of an example filter media pack, showing a stacked configuration of filter media.

FIG. 6 is a top schematic view of an example filter media pack 600, showing a stacked configuration with different types of filter media. The filter media pack 600 has three types of flutes: first flutes 610, second flutes 620, and third flutes 630.

Figure 7:
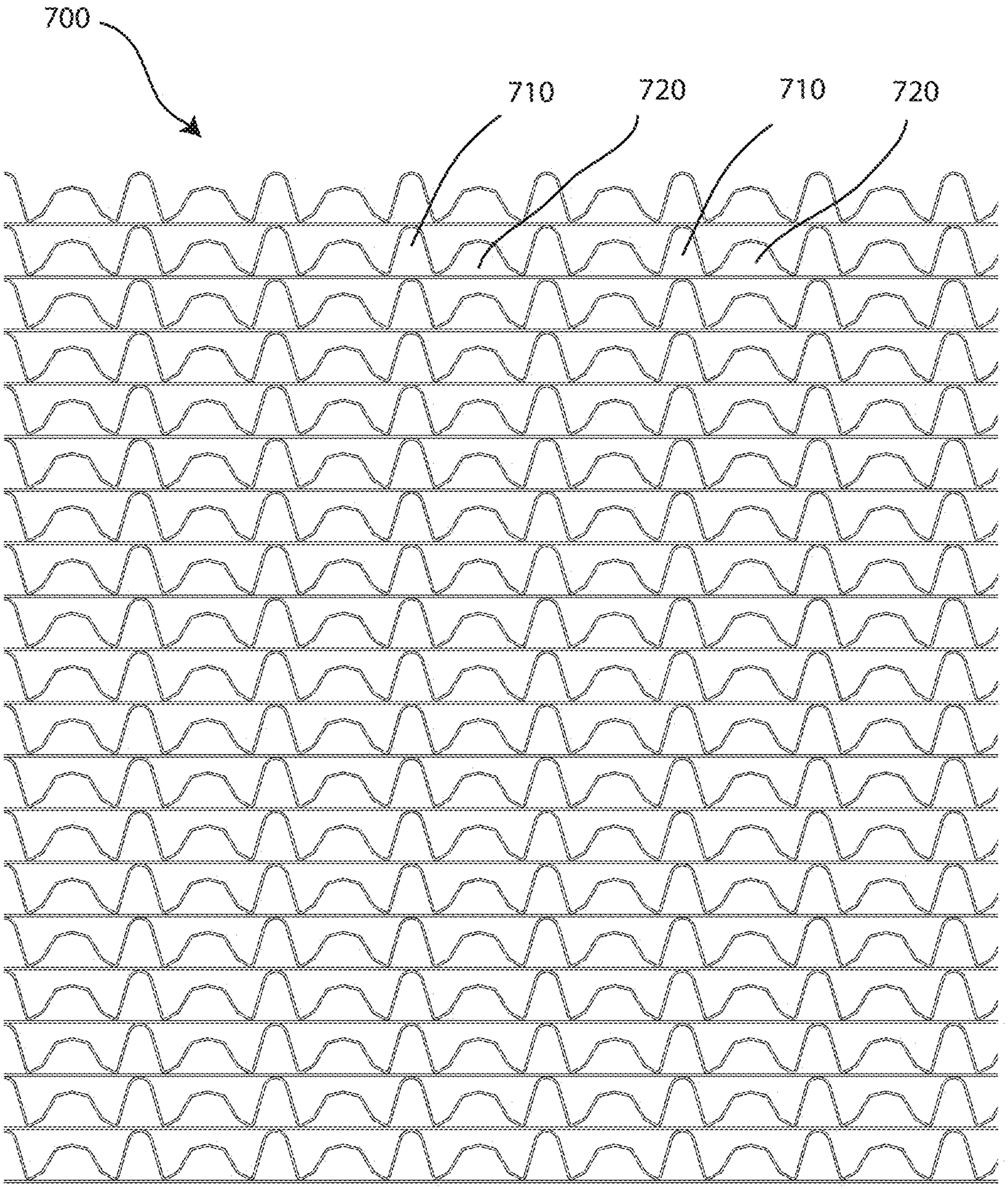
FIG. 7 is a top schematic view of an example filter media pack, showing a stacked configuration of filter media.

FIG. 7 is a top schematic view of an example filter media pack 700, showing a stacked configuration with different types of flutes. The filter media pack 710 has two types of flutes: first flutes 710 and second flutes 720.

Figure 8:
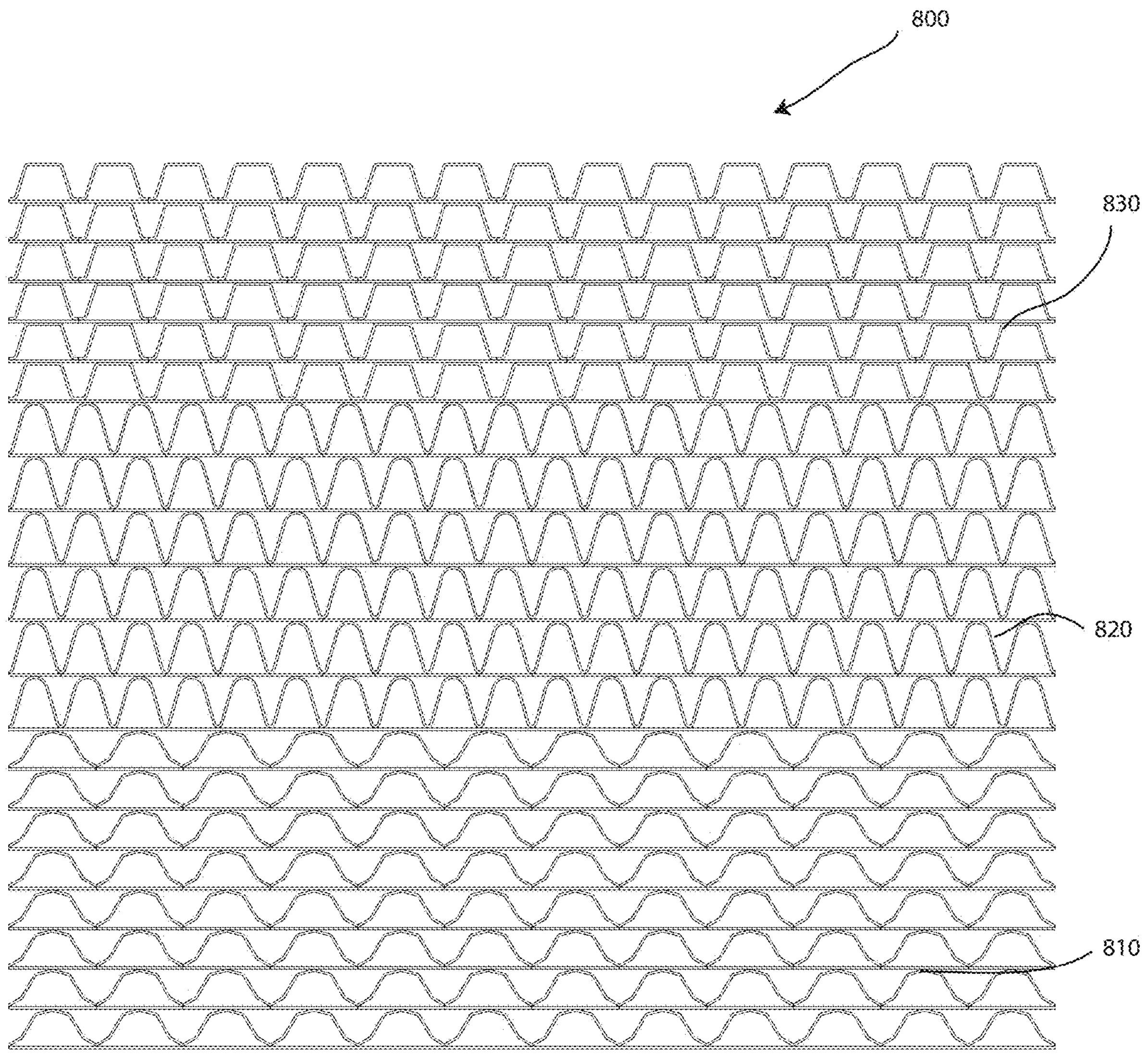
FIG. 8 is a top schematic view of an example filter media pack, showing a stacked configuration with three types of filter media.

FIG. 8 is a top, schematic view of an example filter media pack 800, showing a stacked configuration with three types of filter media. The three types of filter media are first media 810, a second media 820, and a third media 830. The media is shown in a stacked configuration with the three types of filter media being segregated by media type rather than intermixed. In this example embodiment the ratio of filter media 810 to 820 to 830 is approximately 4:3:3, based upon pack entrance area.

Figure 9:
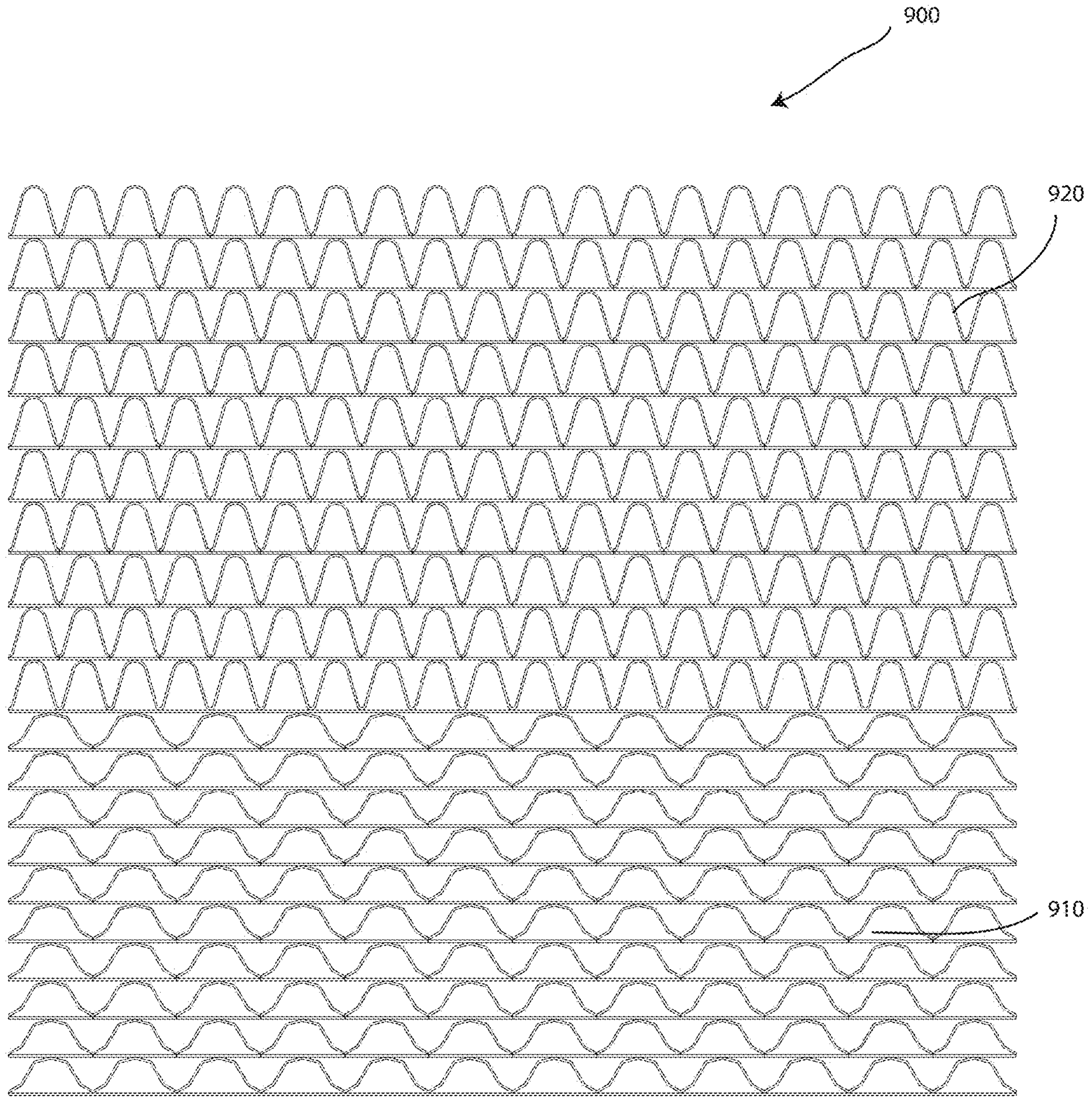
FIG. 9 is a top schematic view of an example filter media pack, showing a stacked configuration with two types of filter media.

FIG. 9 is a top schematic view of an example filter media pack 900, showing a stacked configuration with two types of filter media: first media 910 and second media 920. The media is shown in stacked configuration with the two types of filter media separate rather than intermixed. In this example embodiment the ratio of filter media 910 to 920 is approximately 1:1, based upon total pack entrance area.

Figure 10:
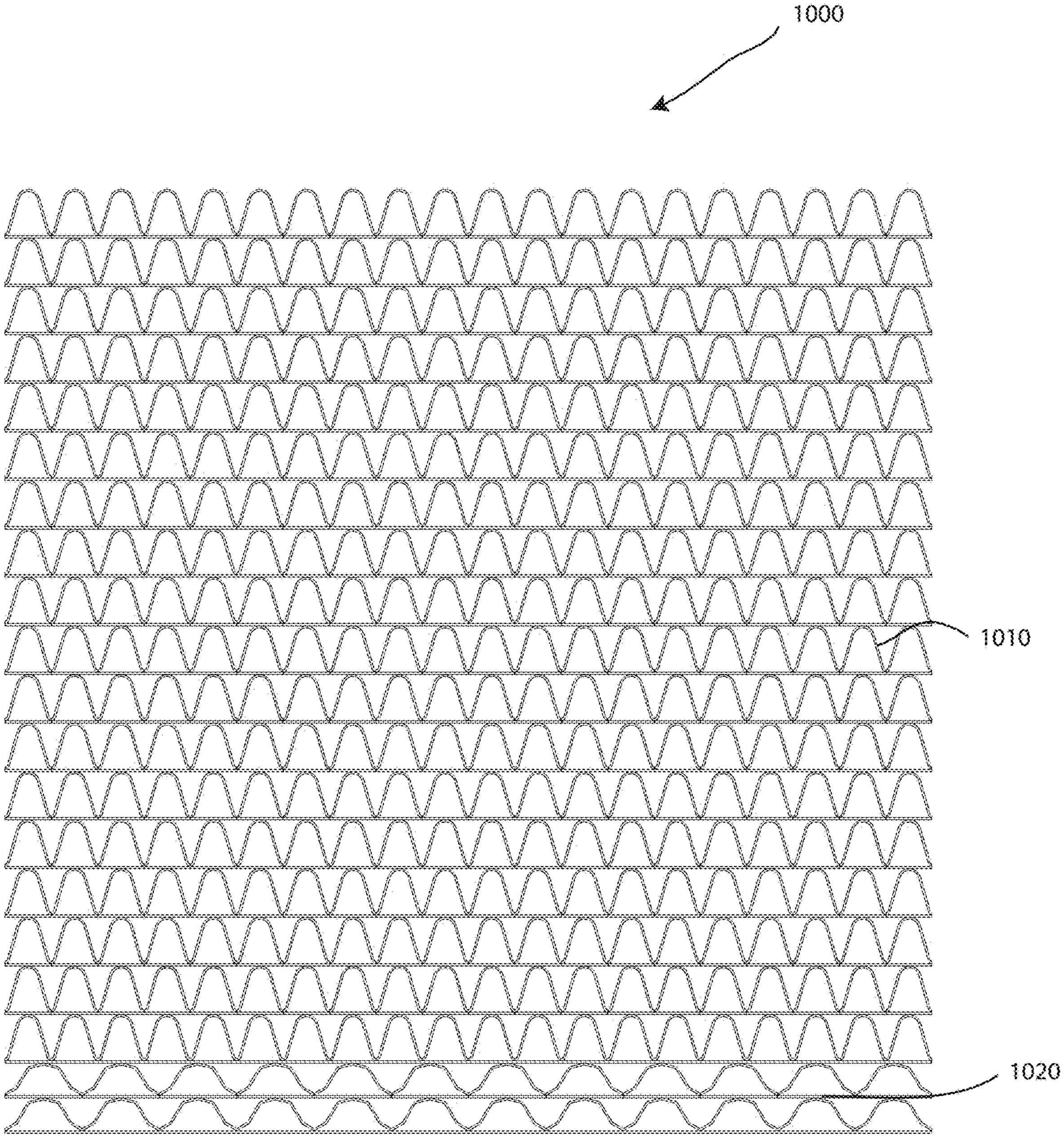
FIG. 10 is a top schematic view of an example filter media pack, showing a stacked configuration with two types of filter media.

FIG. 10 is a top schematic view of an example filter media pack 1000, showing a stacked configuration with two types of filter media: first media 1010 and second media 1020. The media is shown in stacked configuration. In this example embodiment the ratio of filter media 1010 to 1020 is approximately 9:1, based upon total pack entrance area.

Figure 11:
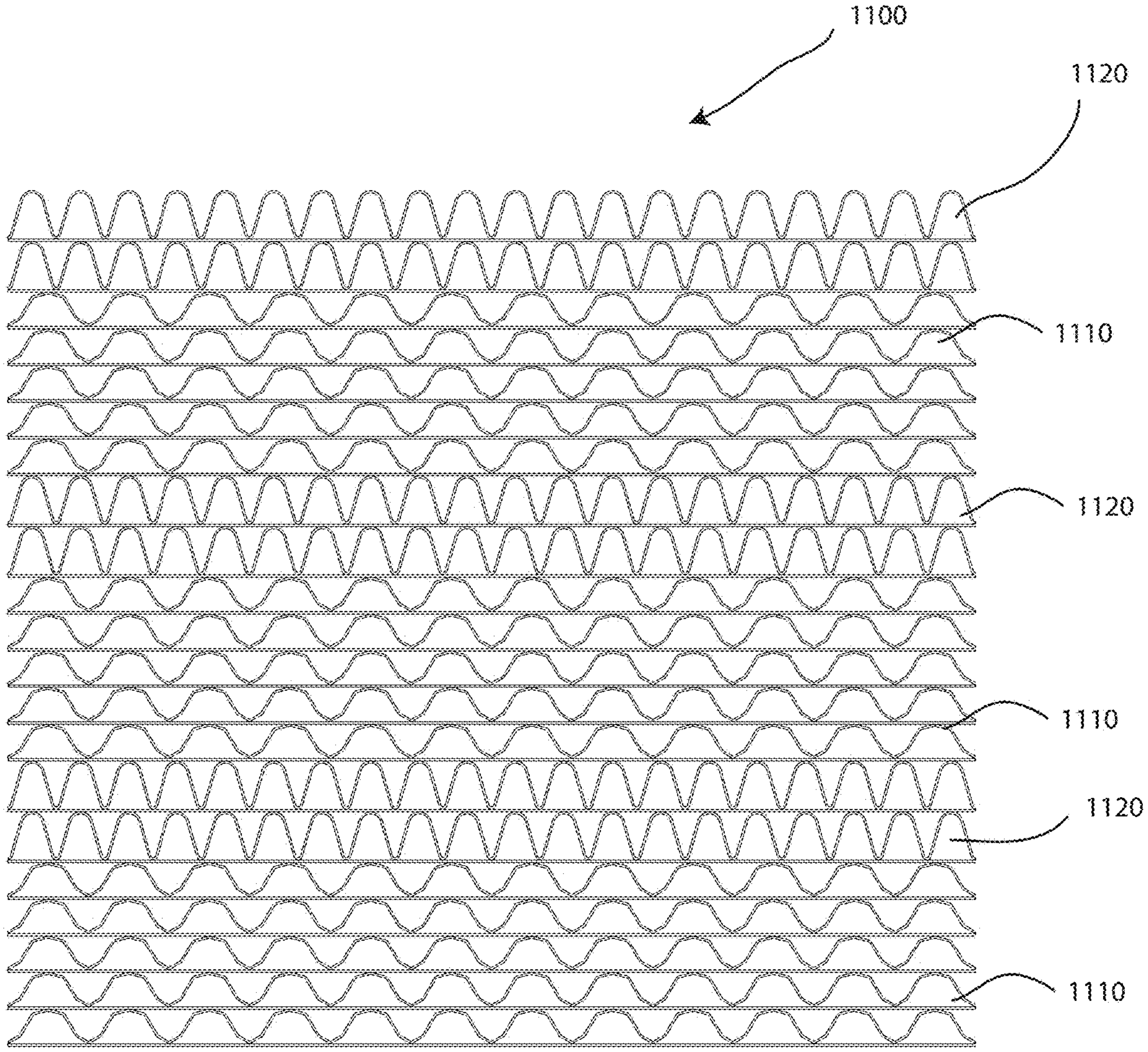
FIG. 11 is a top schematic view of an example filter media pack, showing a stacked configuration with two types of filter media.

FIG. 11 is a top schematic view of an example filter media pack, showing a stacked configuration with two types of filter media. The filter media pack 1100 has two types of filter media: first media 1110 and second media 1120. The media 1110 and 1120 is stacked with five layers of filter media 1110 alternating with two layers of media 1120.

Figure 12:
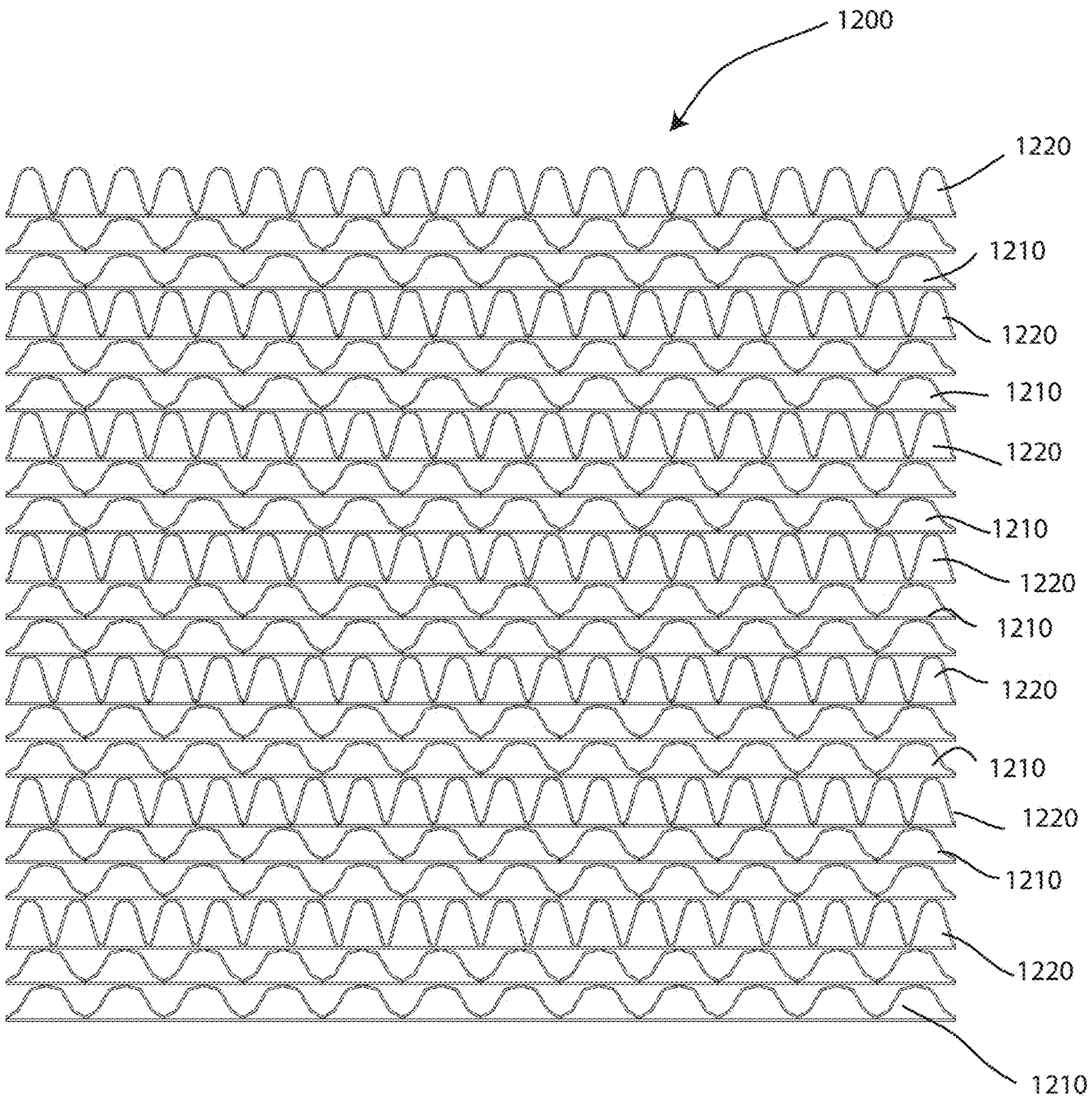
FIG. 12 is a top schematic view of an example filter media pack, showing a stacked configuration with two types of filter media.

FIG. 12 is a top schematic view of an example filter media pack, showing a stacked configuration with two types of filter media. The filter media pack 1200 has two types of filter media: first media 1210 and second media 1220. The media is shown in stacked configuration. The media 1210 and 1220 is stacked with two layers of filter media 1210 alternating with one layer of media 1220.

Figure 13:
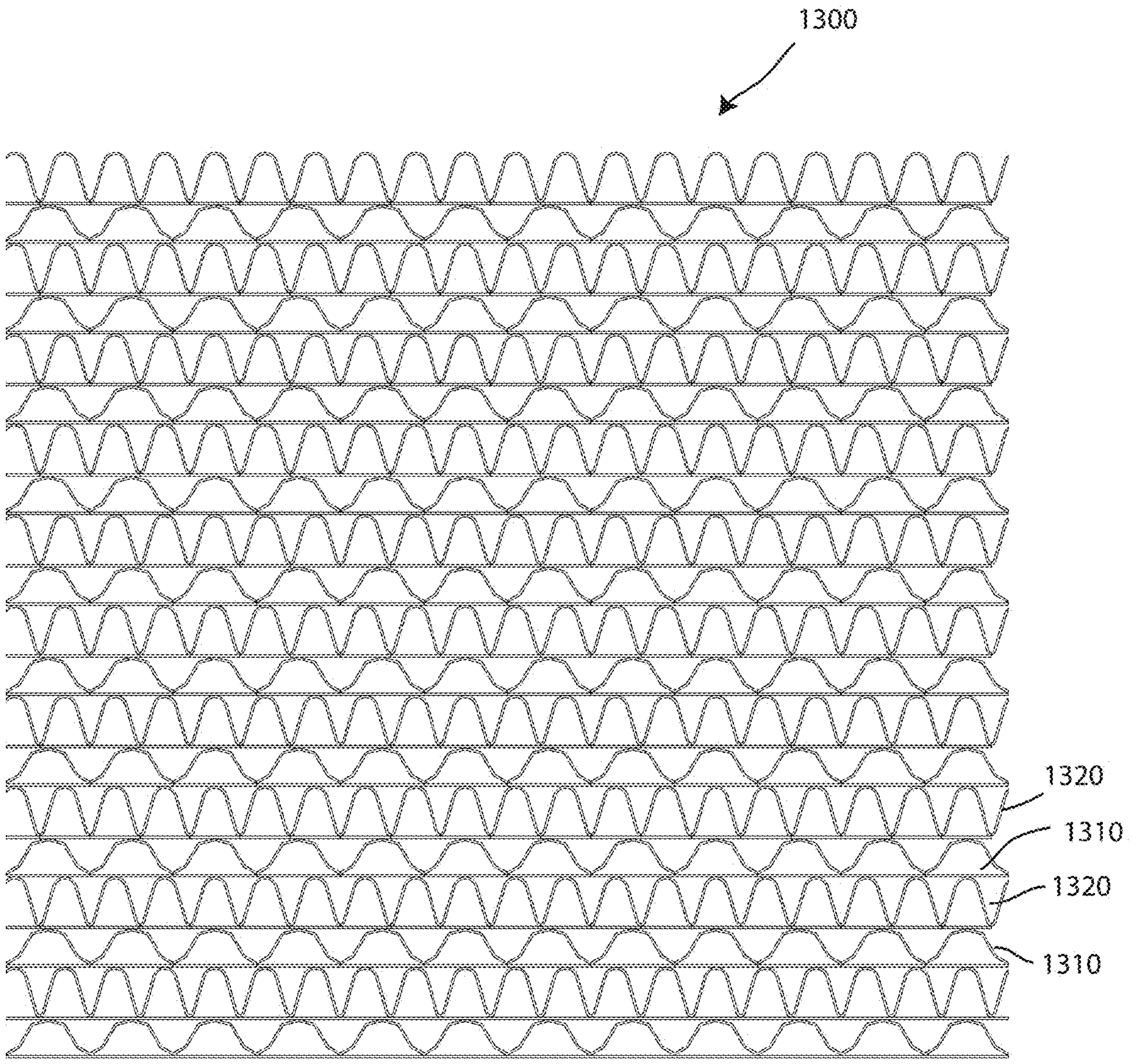
FIG. 13 is a top schematic view of an example filter media pack, showing a stacked configuration with two types of filter media.

FIG. 13 is a top schematic view of an example filter media pack 1300, showing a stacked configuration with two types of filter media. The filter media pack 1300 has two types of filter media: first media 1310 and second media 1320. The media 1310 and 1320 are stacked, with one layer of filter media 1310 alternating with one layer of media 1320.

Figure 14:
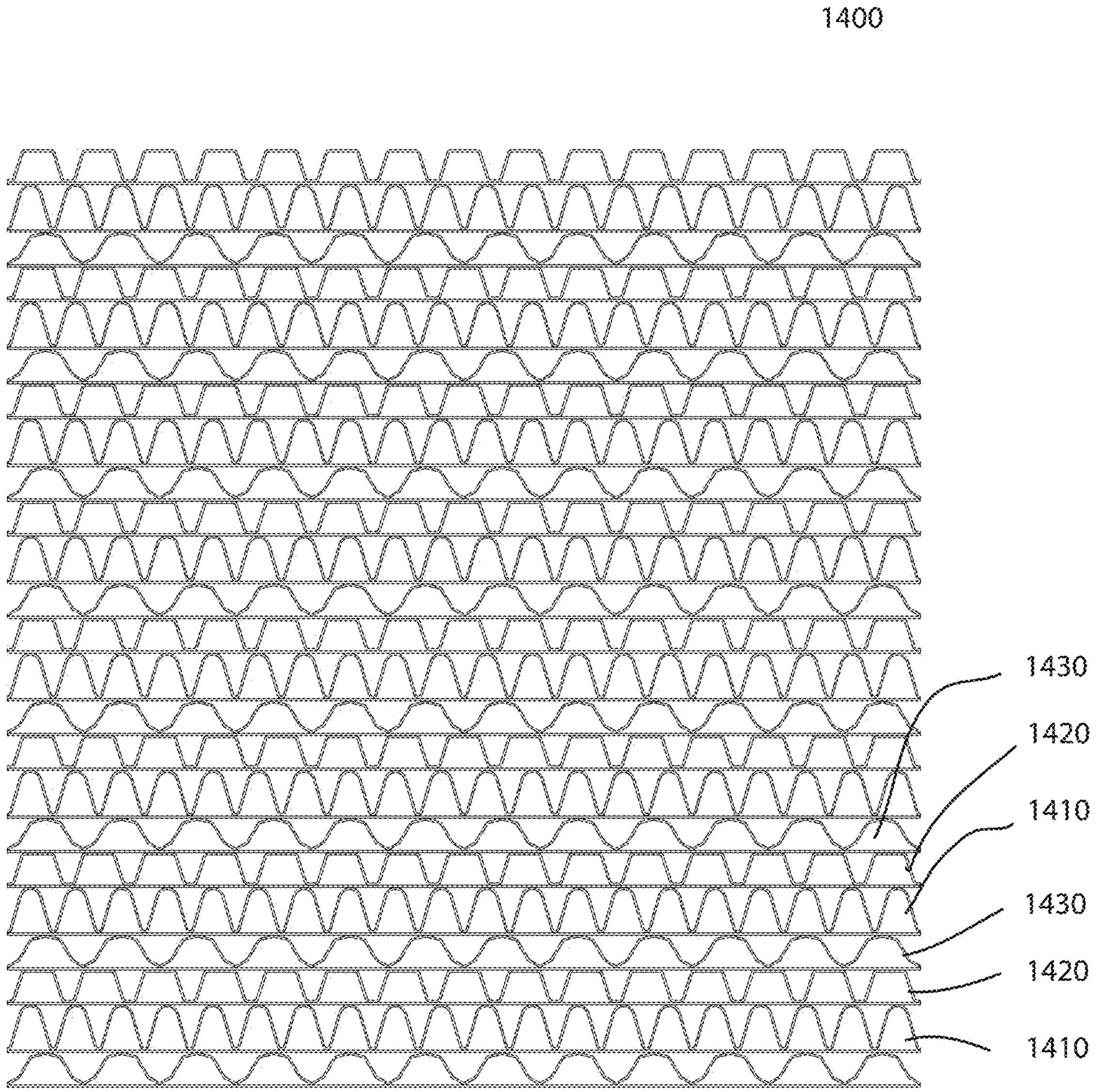
FIG. 14 is a top schematic view of an example filter media pack, showing a stacked configuration with three types of filter media.

FIG. 14 is a top schematic view of an example filter media pack 1400. The filter media pack 1400 has three types of filter media: first media 1410, second media 1420, and third media 1430. The media layers 1410, 1420 and 1430 are arranged in an alternating stack.

Figure 15:
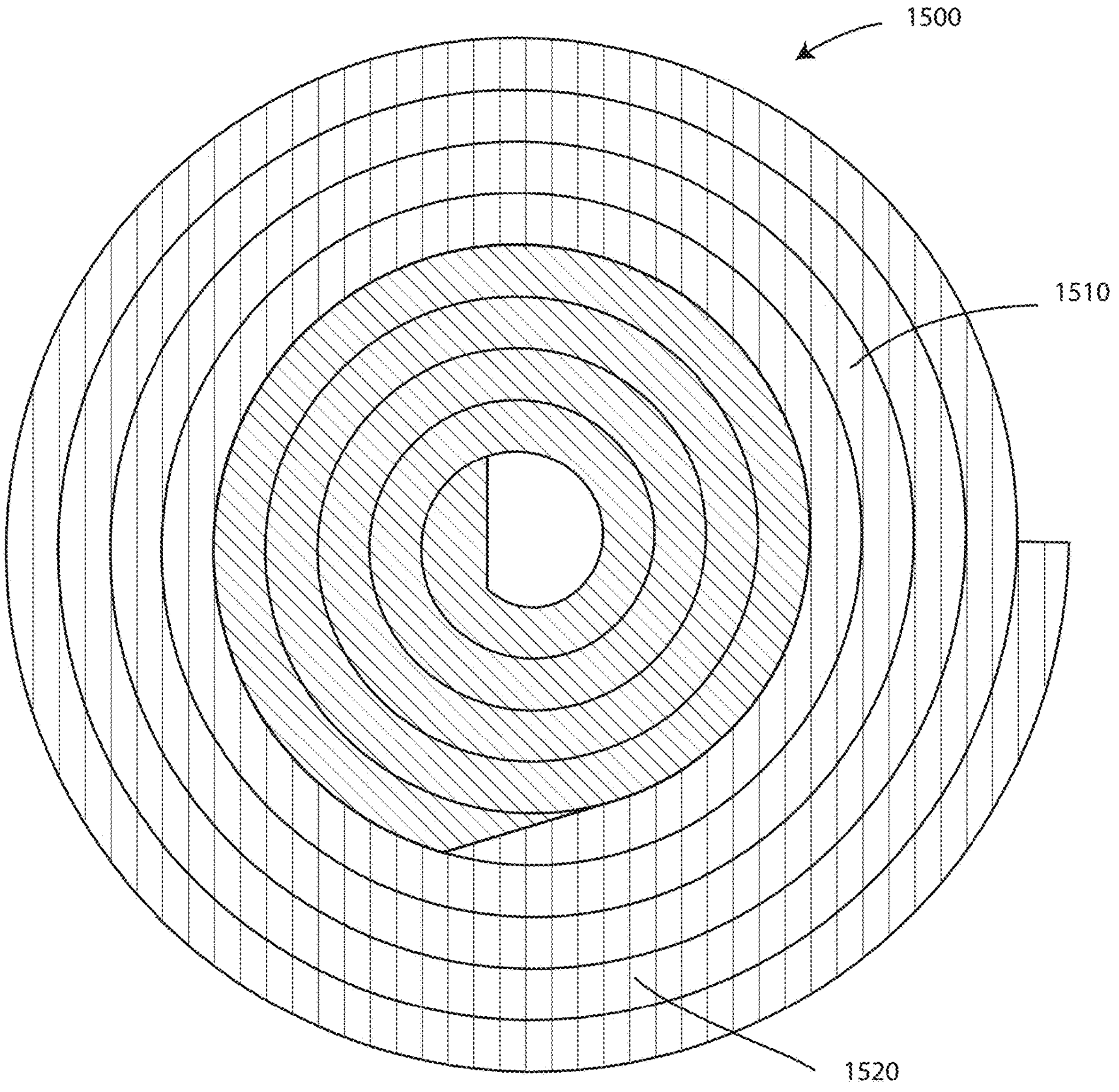
FIG. 15 is a top schematic view of an example filter media pack, showing a wound configuration with two types of filter media.

FIG. 15 is a top schematic view of an example filter media pack 1500, showing a wound configuration with two types of filter media 1510 and 1520. The media is wound with the first media 1510 on the inside and the second media 1520 on the outside, the first and second medias 1510, 1520 spliced together.

Figure 16:
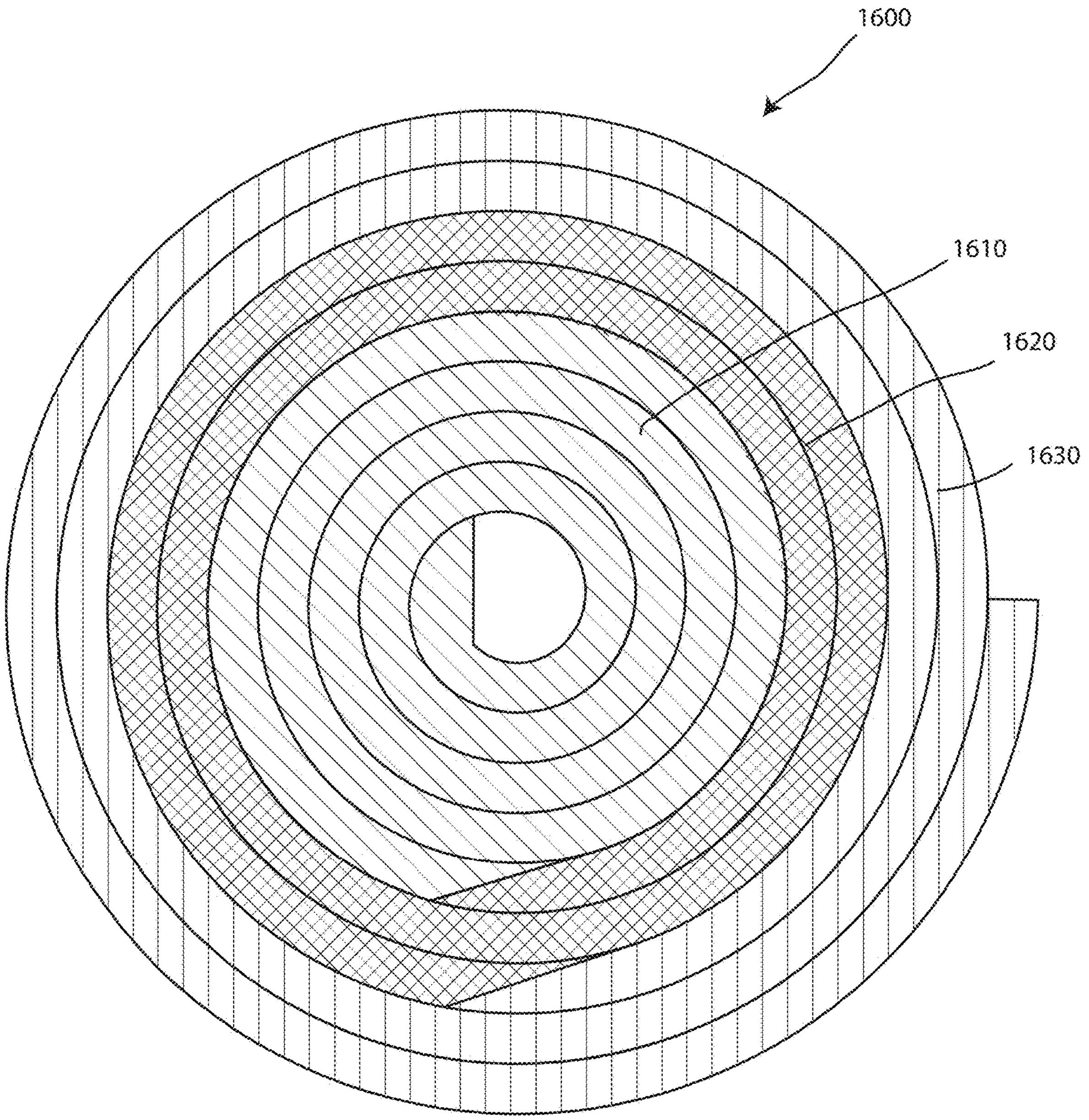
FIG. 16 is a top schematic view of an example filter media pack, showing a wound configuration with three types of filter media.

FIG. 16 is a top schematic view of an example filter media pack 1600, showing a wound configuration with three types of filter media 1610, 1620, and 1630. The media is wound with a first media 1610 on the inside, the second media 1620 in the middle, and the third media 1630 on the outside. The first and second medias 1610, 1620 are spliced together, as are the second and third medias 1620, 1630.

Figure 17:
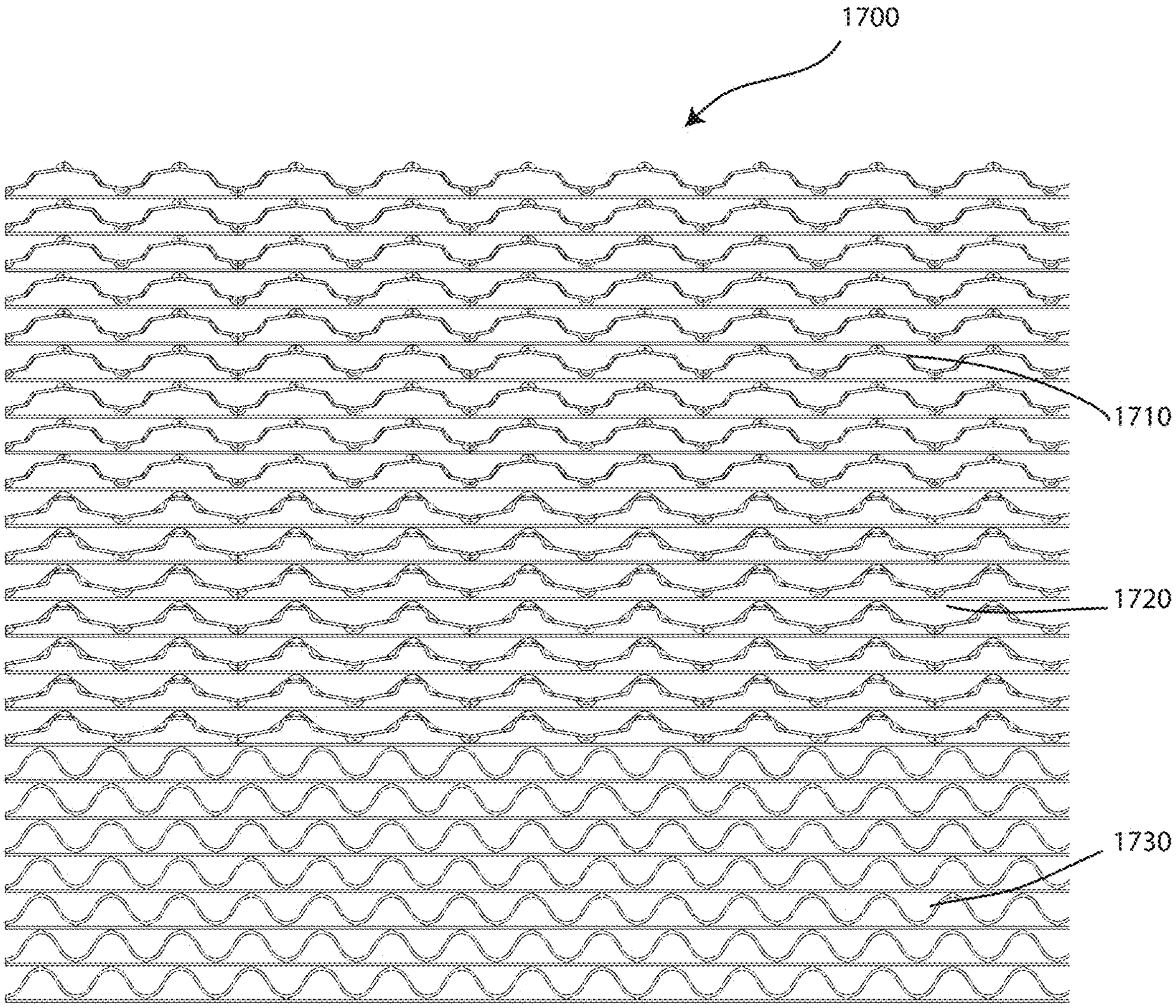
FIG. 17 is a top schematic view of an example filter media pack, showing a stacked configuration with three types of filter media.

FIG. 17 is a top, partial schematic view of an example filter media pack 1700, showing a stacked configuration with three types of filter media. The three types of filter media are first media 1710, second media 1720, and third media 1730. The media is shown in a stacked configuration with the three types of filter media being segregated by media type rather than intermixed. In this example embodiment the ratio of filter media 1710 to 1720 to 1730 is approximately 4:3:3, based upon total pack entrance area.

Figure 18:
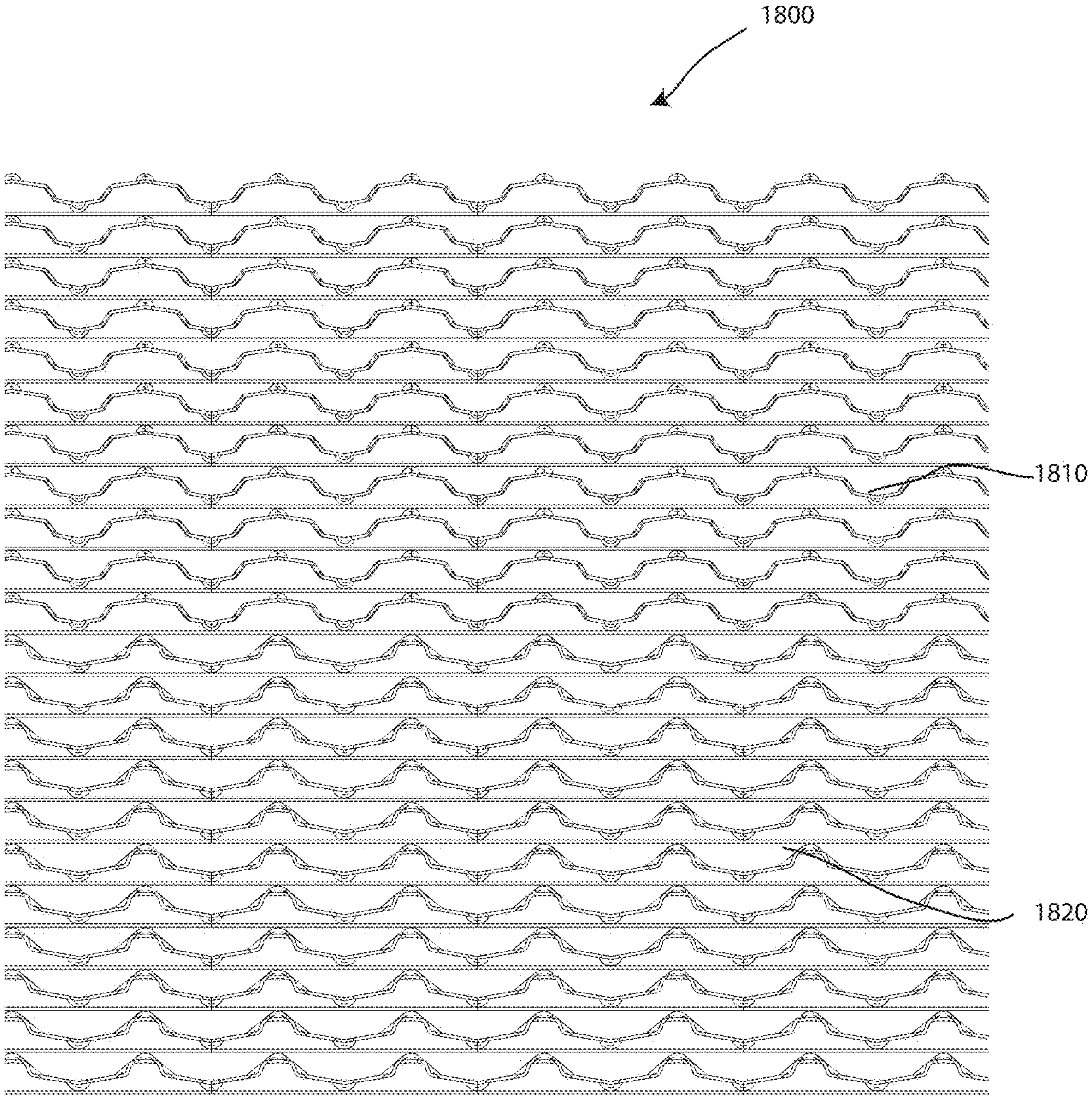
FIG. 18 is a top schematic view of an example filter media pack, showing a stacked configuration with two types of filter media.

FIG. 18 is a top schematic view of an example filter media pack 1800, showing a stacked configuration with two types of filter media: first media 1810 and second media 1820. The media is shown in a stacked configuration with the two types of filter media segregated. In this example embodiment the ratio of filter media 1810 to 1820 is approximately 1:1, based upon total pack entrance area.

Figure 19:
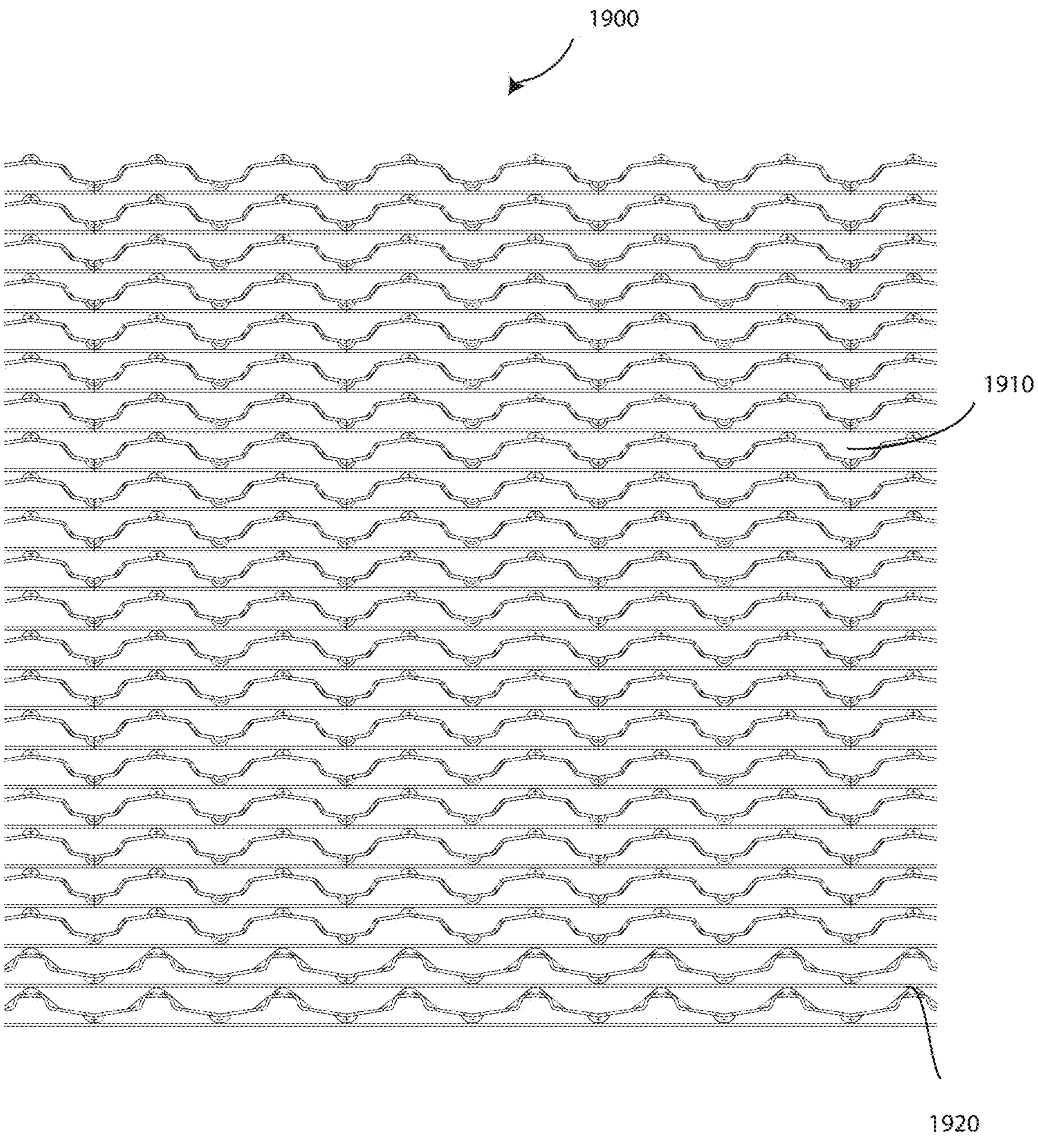
FIG. 19 is a top schematic view of an example filter media pack, showing a stacked configuration with two types of filter media.

FIG. 19 is a top schematic view of an example filter media pack 1900, showing a stacked configuration with two types of filter media. The filter media pack 1900 has two types of filter media: first media 1910 and second media 1920. The media is shown in stacked configuration. In this example embodiment the ratio of filter media 1910 to 1920 is approximately 9:1, based upon total pack entrance area.

Figure 20:
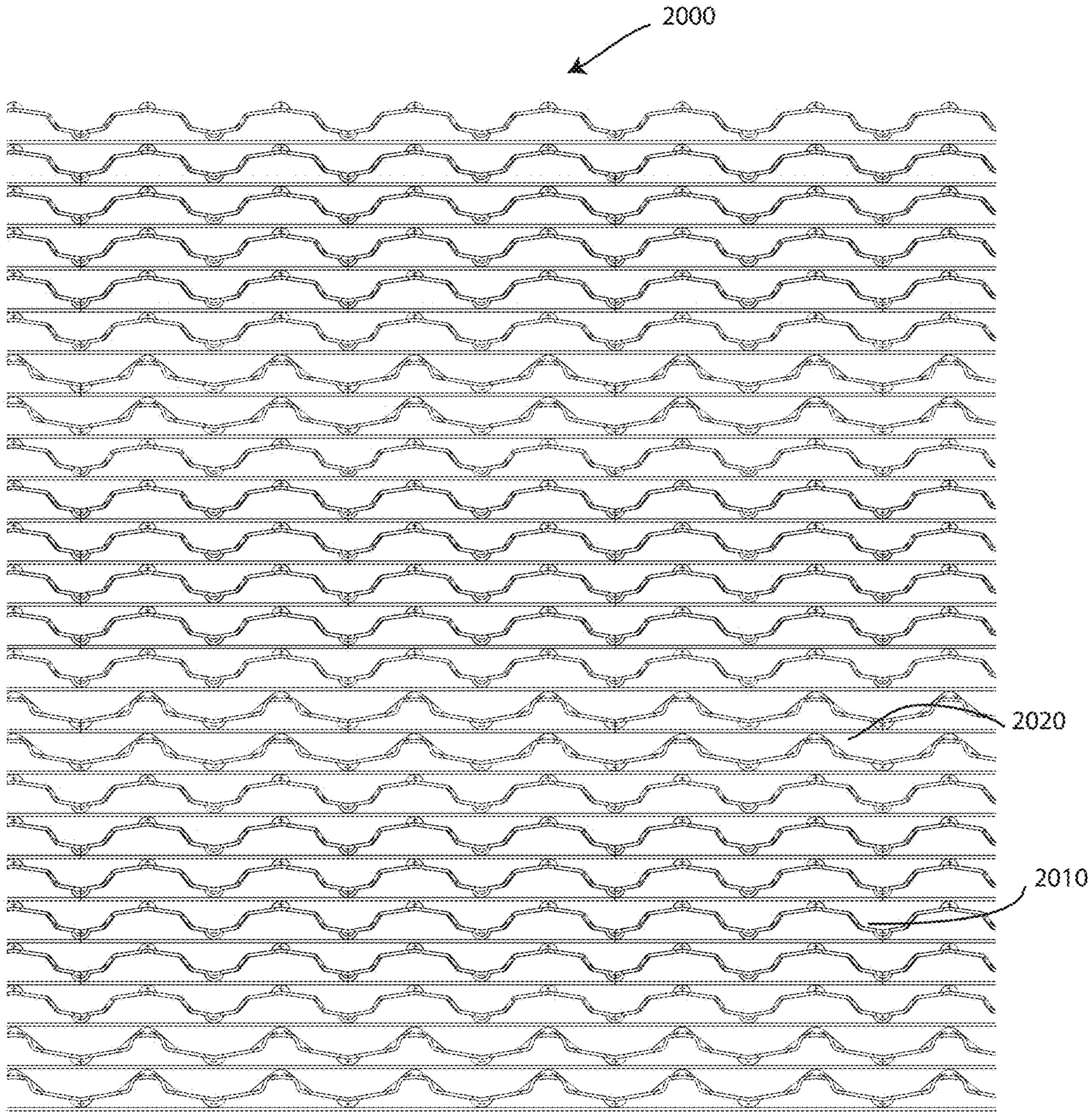
FIG. 20 is a top schematic view of an example filter media pack, showing a stacked configuration with two types of filter media.

FIG. 20 is a top schematic view of an example filter media pack 2000, showing a stacked configuration with two types of filter media. The filter media pack 2000 has two types of filter media: first media 2010 and second media 2020. The media pack 2000 has six layers of filter media 2010 alternating with two layers of media 2020.

Figure 21:
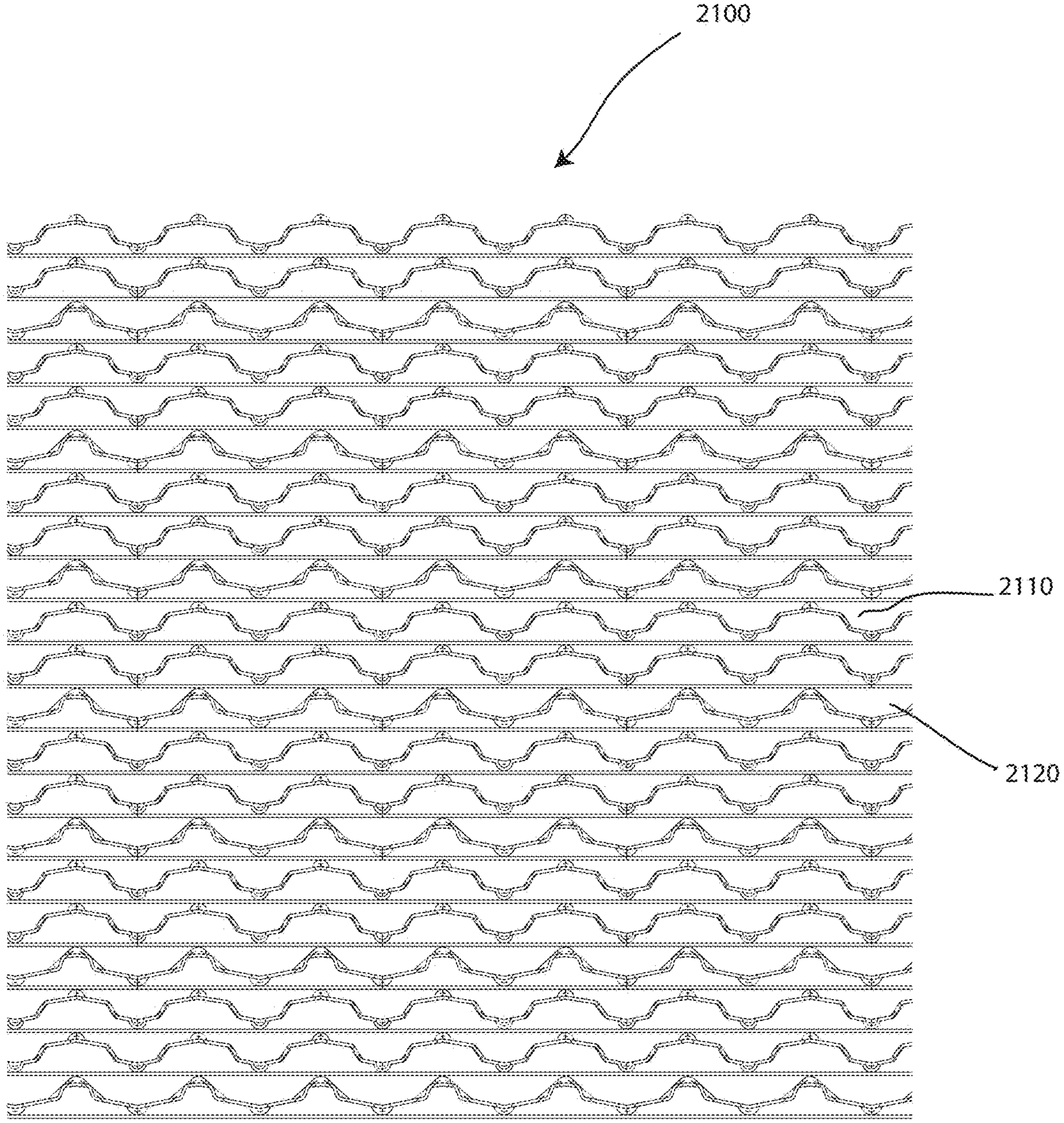
FIG. 21 is a top schematic view of an example filter media pack, showing a stacked configuration with two types of filter media.

FIG. 21 is a top schematic view of an example filter media pack 2100, showing a stacked configuration with two types of filter media. The filter media pack 2100 has two types of filter media: first media 2110 and second media 2120. The media pack 2100 has two layers of filter media 2110 alternating with one layer of media 2120.

Figure 22:
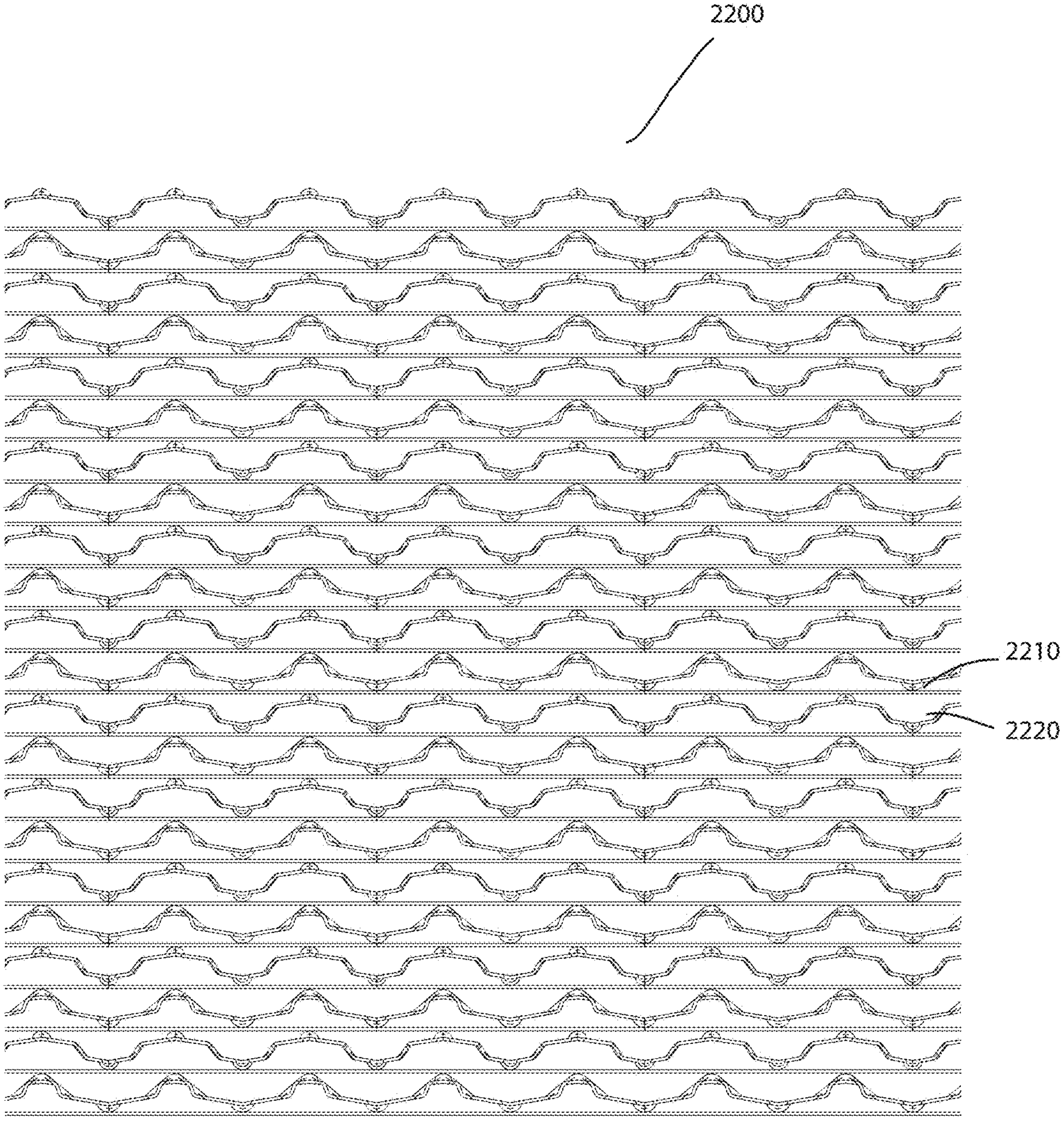
FIG. 22 is a top schematic view of an example filter media pack, showing a stacked configuration with two types of filter media.

FIG. 22 is a top, partial schematic view of an example filter media pack 2200, showing a stacked configuration with two types of filter media. The two types of filter media are first media 2210 and a second media 2220. The media is shown in a stacked configuration with the two types of filter media intermixed.

Figure 23:
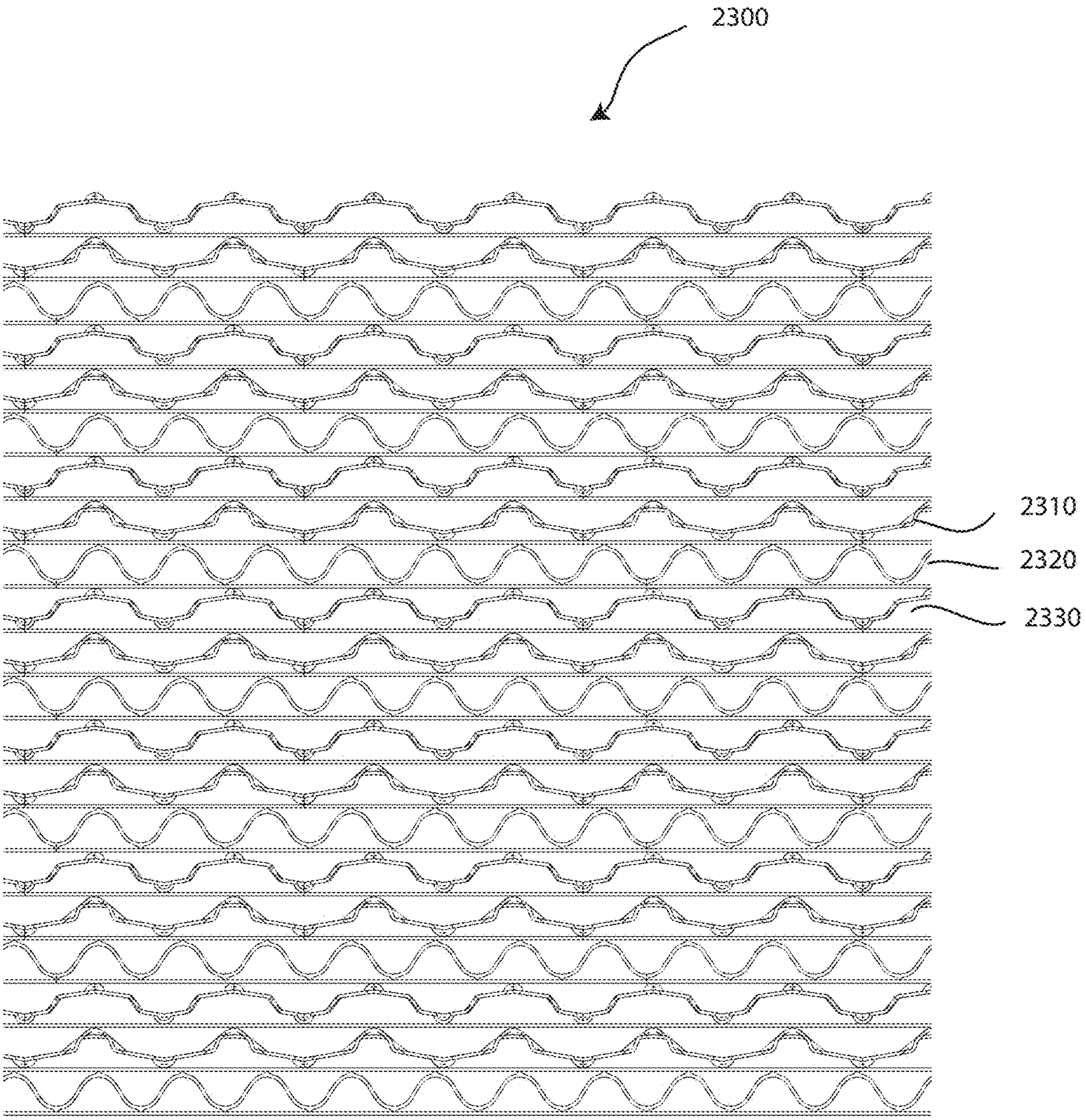
FIG. 23 is a top schematic view of an example filter media pack, showing a stacked configuration with three types of filter media.

FIG. 23 is a top, partial schematic view of an example filter media pack 2300, showing a stacked configuration with three types of filter media. The three types of filter media are first media 2310, a second media 2320, and a third media 2330. The media is shown in a stacked configuration with the three types of filter media intermixed.

Figure 24A:
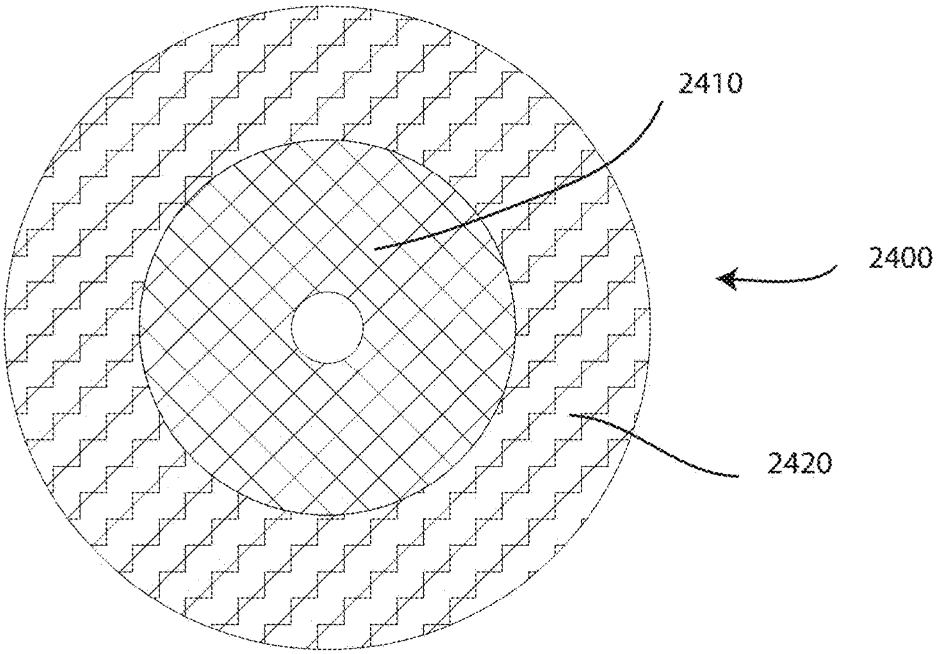
FIG. 24A is a top schematic view of an example filter media pack, showing a wound configuration with two types of filter media.

FIG. 24A is a top schematic view of an example filter media pack 2400, showing a wound configuration with two types of filter media: first media 2410, and second media 2420. The media is shown in a wound configuration with the two types of media distinct from one another by having filter media 2420 laid down first, and then filter media 2420 laid down second. In this example embodiment the ratio of pack entrance area 2420 to 2410 is approximately 2:1. This construction can be created by, for example, wrapping a first singleface media type for a period, cutting that web and splicing a second singleface media type to the end region of the first single face media type, continuing the wrapping process, and repeating for as many singleface media types as desired. Alternatively, winding of each singleface media type can be done separately, and the sections can be brought together and sealed as a secondary process.

Figure 24B:
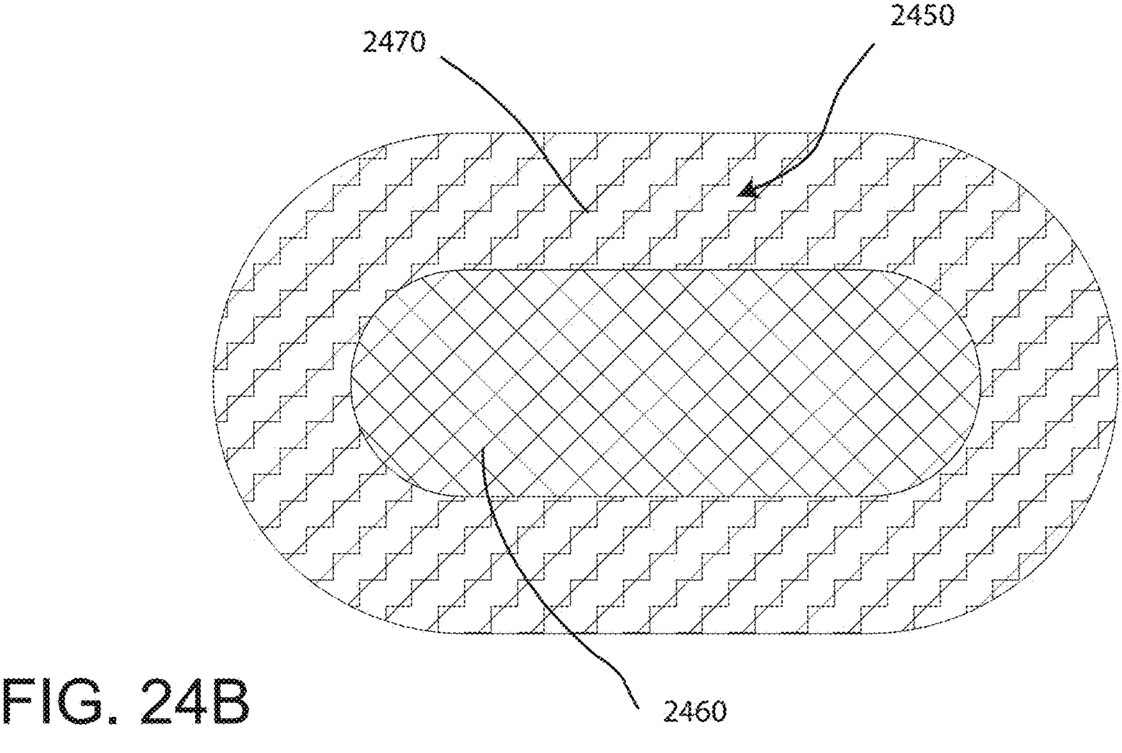
FIG. 24B is a top schematic view of an example filter media pack, showing a wound configuration with two types of filter media.

FIG. 24B is a top schematic view of an example filter media pack 2450, showing a wound configuration with two types of flutes forming the filter media. The filter media pack 2540 has two types of flutes: first media 2460, and second media 2470. The media is shown in wound configuration with the two types of flutes separated from one another. In this example embodiment the ratio of pack entrance area 2470 to 2460 is approximately 2:1.

Figure 25A:
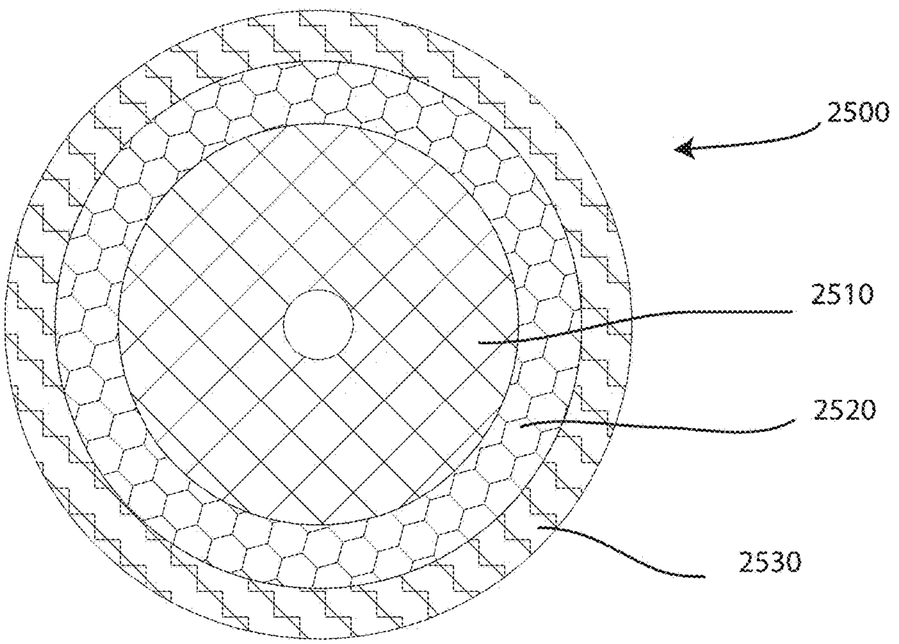
FIG. 25A is a top schematic view of an example filter media pack, showing a wound configuration with three types of filter media.

FIG. 25A is a top schematic view of an example filter media pack 2500, showing a wound configuration with three types of filter media: first media 2510, second media 2520, and third media 2530. The media is shown in a wound configuration with the media separated from one another by having filter media 2520 laid down first, and then second media 2520 laid down on top of media 2510, and third media 2530 is laid down on top of media 2520. In this example embodiment the ratio of pack entrance area 2510 to 2520 to 2530 is approximately 4:3:3.

Figure 25B:
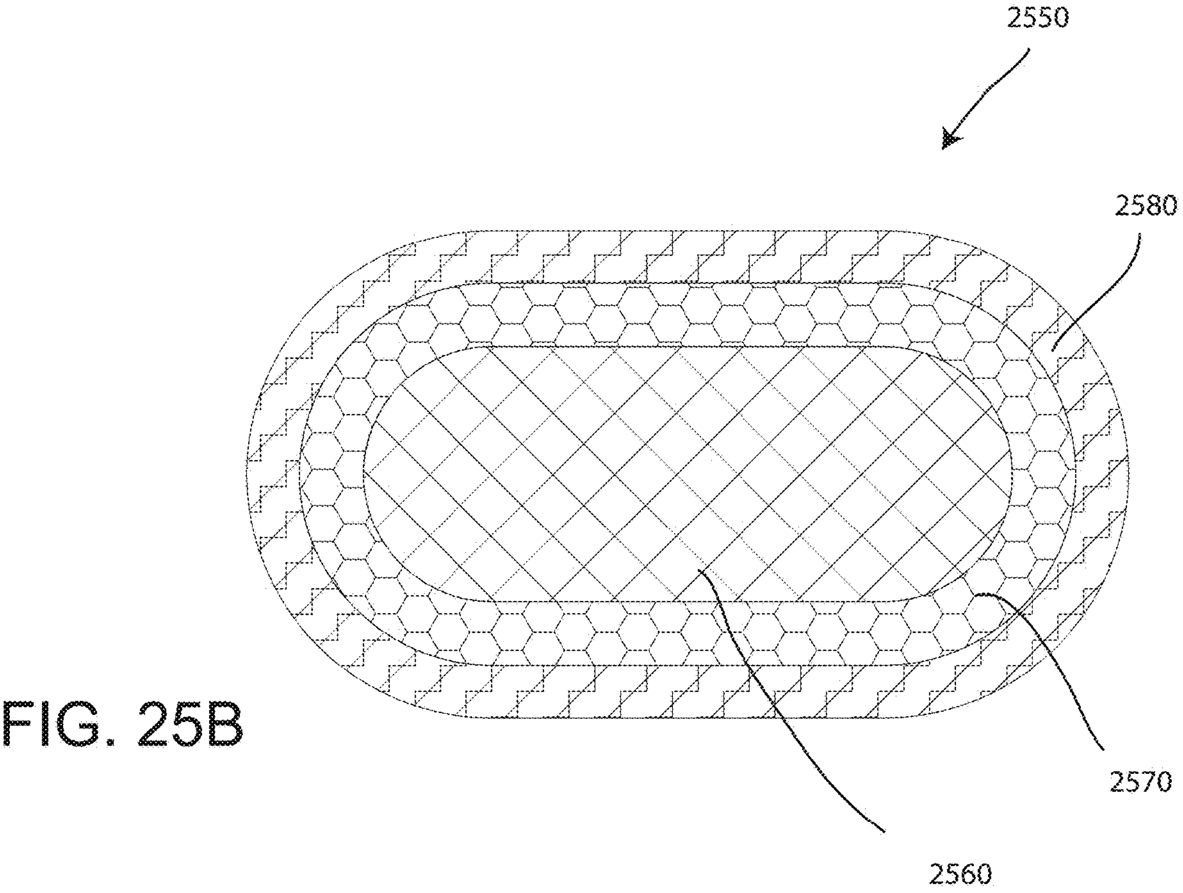
FIG. 25B is a top schematic view of an example filter media pack, showing a wound configuration with three types of filter media.

FIG. 25B is a top schematic view of an example filter media pack 2550, showing a wound configuration with three types of filter media. The filter media pack 2550 has first media 2560, second media 2670 and third media 2680. The media is shown in wound configuration with the three types of media separated from one another. In this example embodiment the ratio of pack entrance area 2560 to 2570 to 2580 is approximately 4:3:3.

Figure 26A:
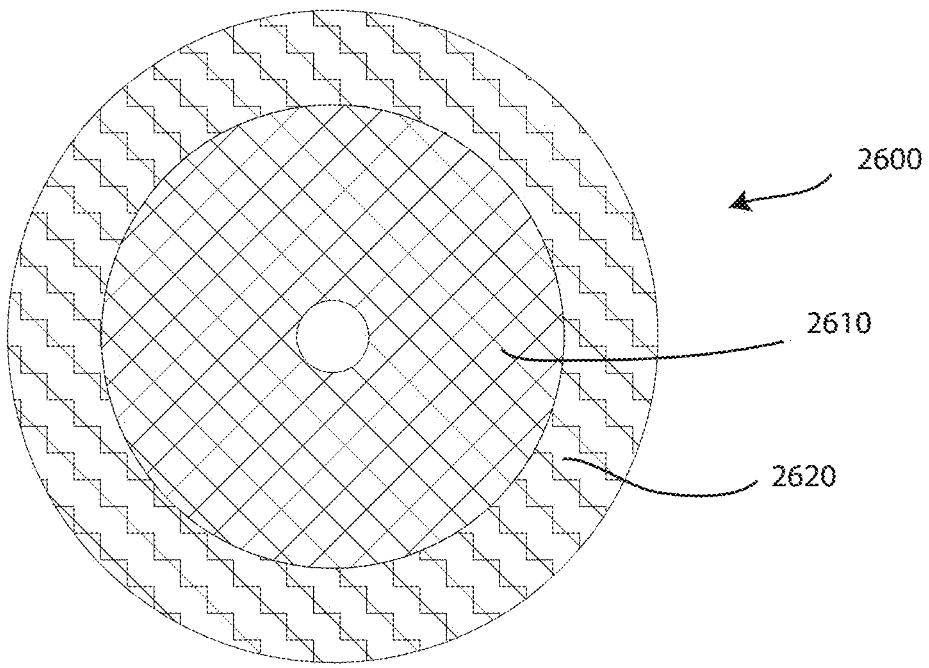
FIG. 26A is a top schematic view of an example filter media pack, showing a wound configuration with two types of filter media.

FIG. 26A is a top schematic view of an example filter media pack 2600, showing a wound configuration with two types of filter media. The filter media pack 2600 has two types of filter media: first media 2610, and second media 2620. The media is shown in a wound configuration with the two types of media separate on one another by having filter media 2620 laid down first, and then filter media 2620 laid down on top of media 2610. In this example embodiment the ratio of pack entrance area 2610 to 2620 is approximately 1:1.

Figure 26B:
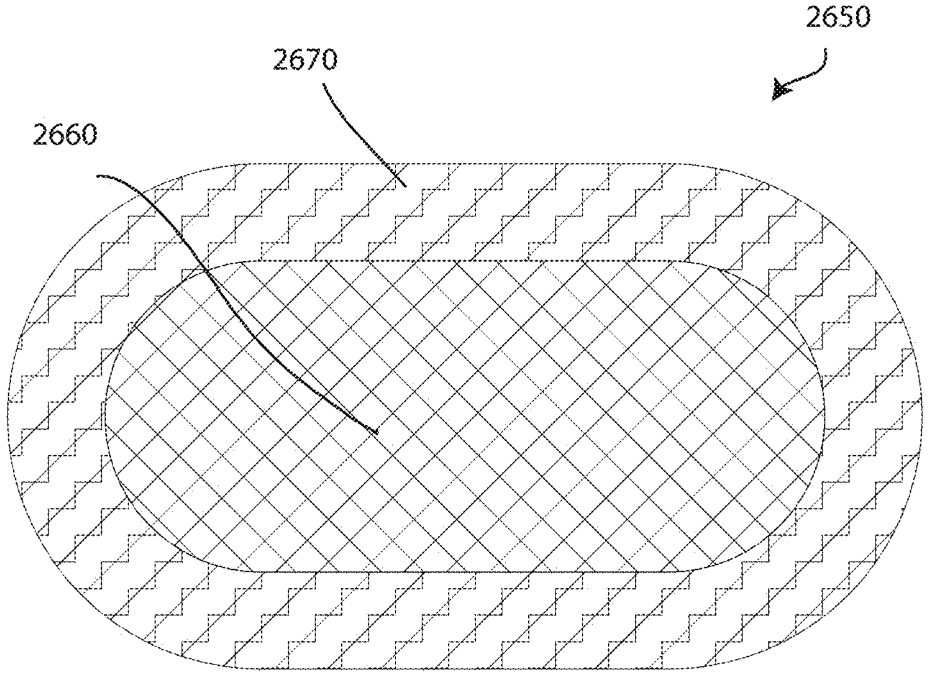
FIG. 26B is a top schematic view of an example filter media pack, showing a wound configuration with two types of filter media.

FIG. 26B is a top schematic view of an example filter media pack 2650, showing a wound configuration with two types of filter media. The filter media pack 2540 has two types of filter media: first media 2660, and second media 2670. The media is shown in wound configuration with the two types of media separated from one another. In this example embodiment the ratio of pack entrance area 2660 to 2670 is approximately 1:1.

Figure 27:
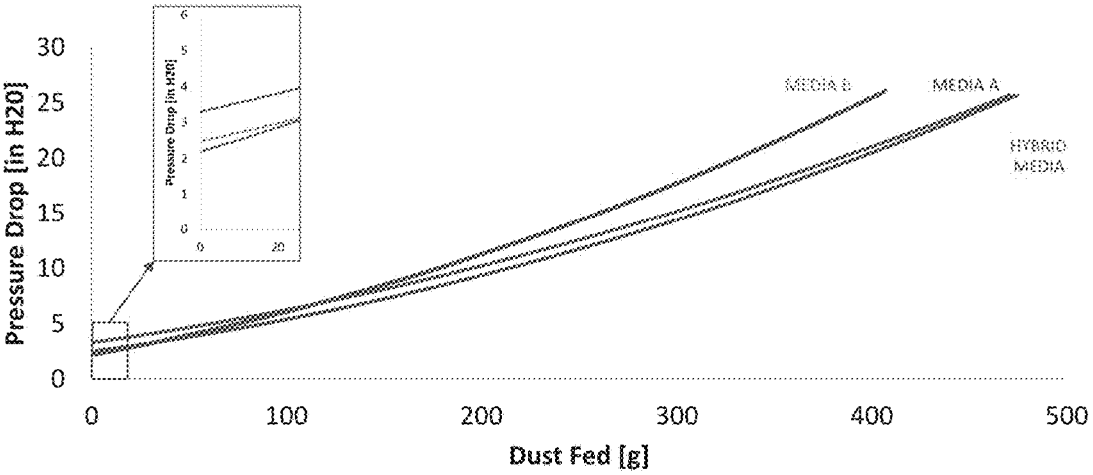
FIG. 27 shows performance results from comparative testing of filter elements with different media types.

Aspects may be better understood with reference to the following example, in which Element A, Element B, and Element C were compared to one another. Element A was composed entirely of Media A with flutes having a width of approximately 10.7 millimeters and height of 3.2 millimeters and a tapered cross-sectional area. Element B was composed entirely of Media B with flutes having a width of approximately 8.0 millimeters and a height of approximately 2.7 millimeters and a tapered area. The flute density per square centimeter was approximately 2.8 for Element A and 4.4 for Element B. Element C was composed of 50 percent by volume with Media A, and 50 percent by volume of Media B to form a Hybrid Media. FIG. 27 shows a loading curve for filter elements made using Media A, Media B, and the Hybrid Media. The loading curve shows the pressure loss of the filter elements as the grams of dust increases from zero to up to less than 500 grams. As shown in FIG. 27, Media B and the hybrid media started with very similar restriction levels (approximately 2.5 inches of $H_2O$), while Media A had a higher initial pressure loss, which is approximately 3.2 inches of $H_2O$. As dust begins to load the pressure loss across all elements increases, however Media A and the Hybrid Media have a slower increase in pressure loss than Media B, with the pressure loss of Media A and Media B crossing (or being the same) at about 125 grams of dust. Thus, the Hybrid Media tracked closely with Media B when dust loading was just starting, and then tracked closely with Media A as the dust loading increased to higher levels. In other words, the hybrid media had initial restriction similar to Media B, but loading similar to Media A.

In order to further test improved filter performance, a test bench was set up with a two-duct system having 5 to 9 cubic meters per minute of air flow, configured to measure pressure loss, as well as outlet restriction values. Relative performance of media elements formed using combinations of filter medias was investigated by constructing various filter element designs. The elements were formed with z-flow media arranged in a stacked configuration. The elements each had a 150 by 150 millimeter inlet face and a 150 by 150 millimeter outlet face and were 150 millimeters deep. Filter elements were made with two types of media: Media A and Media B. Media A and Media B had media flute constructions consistent with those shown in U.S. Pat. No. 9,623,362, entitled Filtration Media Pack, Filter Elements, and Air Filtration Media to inventor Scott M. Brown and assigned to Donaldson Company, Inc. Media A and B were both primarily cellulosic media. Media A had a flute height of about 0.092 inch, flute width of about 0.314 inch, and flute length of about 150 millimeters (including flute plugs). Media B had a flute height of about 0.140 inch, flute width of about 0.430 inch, and flute length of about 150 millimeters (including flute plugs). A first type of "segmented" media pack was assembled packs of Media A and Media B located next to one another in parallel flow. A second type of "layered" media pack included alternating sheets of Media A and Media B.

Figure 28A:
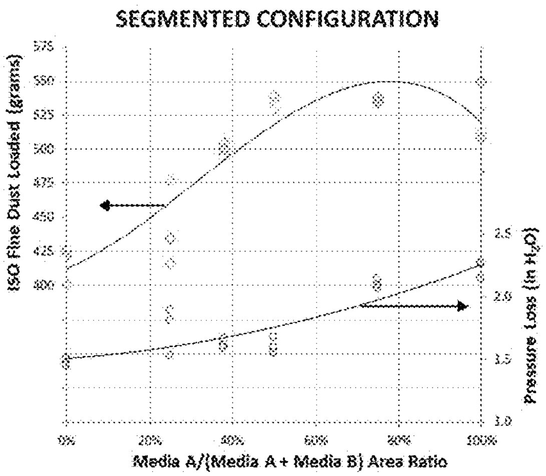
FIGS. 28A and 28B show performance results, including dust loading and pressure loss, for various media constructions.
Figure 28B:
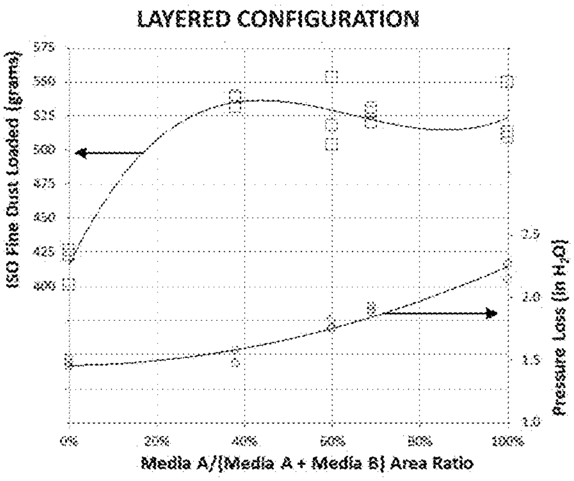
Figure 29A:
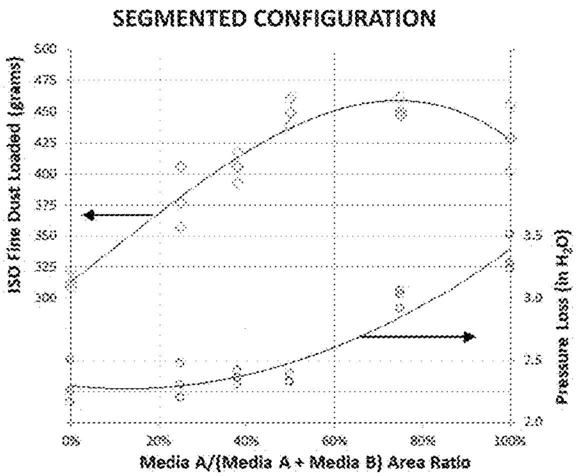
FIGS. 29A and 29B show performance results, including dust loading and pressure loss, for various media constructions.
Figure 29B:
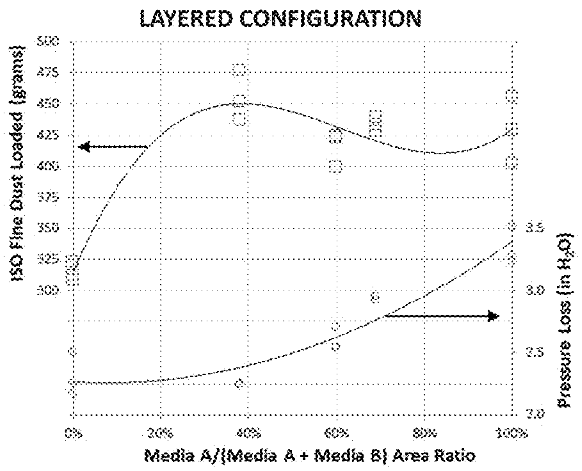
Figure 30A:
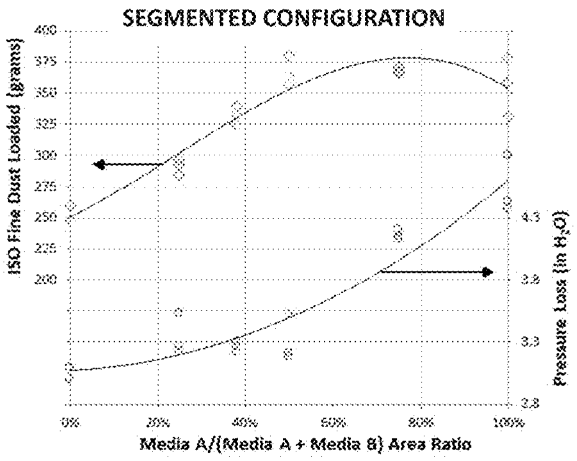
FIGS. 30A and 30B show performance results, including dust loading and pressure loss, for various media constructions.
Figure 30B:
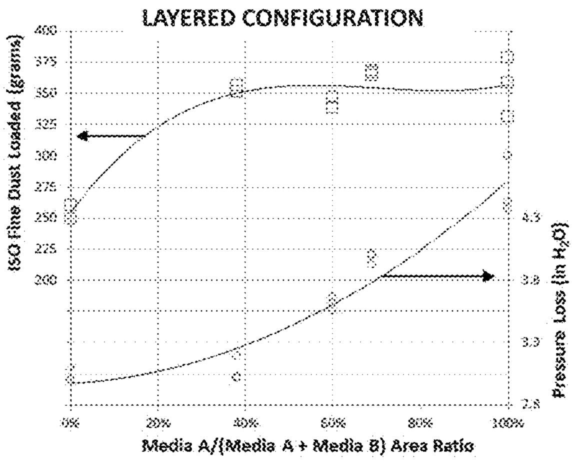

FIGS. 28A to 30B show performance results, including dust loading and pressure loss, for various media constructions. FIGS. 28A, 29A and 30A show results for a segmented configuration (Media A was grouped together and all of Media B was grouped together); and FIGS. 28B, 29B, and 30B show results for a layered configuration (in which at least some of the Media A and Media layers were intermixed). Thus, the media constructions include either Media A, Media B, or various percentages by volume of Media A and Media B. Media on the far left of each graph, denoted as 0%, has no Media A and is thus entirely Media B. Media on the far right, denoted as 100%, have only Media A and thus no Media B. The Y axis contains both ISO fine dust loading measured in grams, as well as pressure loss measured in inches of water.

FIGS. 28A and 28B shows performance results, including dust loading and pressure loss, for various media constructions at a cube flow rate of 5.83 cubic meters per minute. From FIGS. 28A and 28B it will be observed that the best performance, specifically the highest dust loading, was achieved with a hybrid media: the hybrid media pack containing both Media A and Media B had higher dust loading capacity than either Media A or Media B alone.

FIGS. 29A and 29B show performance results, including dust loading and pressure loss, for various media constructions at a cube flow rate of 7.37 cubic meters per minute. Again, as with FIGS. 29A and 29B, the best performance was with a hybrid media of both Media A and Media B.

FIGS. 30A and 30B show performance results, including dust loading and pressure loss, for various media constructions at a cube flow rate of 8.78 cubic meters per minute. From FIGS. 30A and 30B it will be observed that the best performance, specifically the highest dust loading, was again achieved with a hybrid media.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

Aspects have been described with reference to various specific and preferred embodiments and techniques. However, it should be understood that many variations and modifications may be made while remaining within the spirit and scope herein.

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The invention claimed is:

1. An air filtration media pack comprising:

filter media comprising a first plurality of flutes, a second plurality of flutes, and a third plurality of flutes: the filter media containing the first, second, and third plurality of flutes being arranged in a parallel flow configuration;

wherein the first, second; and third plurality of flutes exhibit differences in flute shape, flute size, flute height, flute width, or cross-flute area;

wherein the interior of the flutes comprise substantially open interior volumes prior to use;

wherein the first plurality of flutes is arranged in a first plurality of layers of the fluted media, and the second plurality of flutes is arranged in a second plurality of layers of the filter media.

2. The air filtration media pack of claim 1, wherein the first and second plurality of flutes are arranged together within at least one layer of the filter media.

3. The air filtration media pack of claim 1, wherein the first plurality of flutes is arranged in a first plurality of layers of the filter media, the second plurality of flutes is arranged in a second plurality of layers of the filter media; and a third plurality of flutes is arranged in a third plurality of layers of the filter media.

4. The air filtration media pack of claim 1, wherein the first plurality of flutes comprises from 10 to 90 percent of the volume of the media pack, and the second plurality of flutes comprises from 90 to 10 percent of the volume of the media pack.

5. The air filtration media pack of claim 1, wherein the first plurality of flutes comprises from 20 to 40 percent of the volume of the media pack, and the second plurality of flutes comprises from 60 to 80 percent of the volume of the media pack.

6. The air filtration media pack of claim 1, wherein the first plurality of flutes comprises from 40 to 60 percent of the volume of the media pack, and the second plurality of flutes comprises from 60 to 40 percent of the volume of the media pack.

7. The air filtration media pack of claim 1, wherein the first plurality of flutes comprises from 10 to 90 percent of the media surface area of the media pack, and the second plurality of flutes comprises from 90 to 10 percent of the media surface area of the media pack.

8. The air filtration media pack of claim 1, wherein the first plurality of flutes comprises from 20 to 40 percent of the media surface area of the media pack, and the second plurality of flutes comprises from 60 to 80 percent of the media surface area of the media pack.

9. The air filtration media pack of claim 1, wherein the first plurality of flutes comprises from 40 to 60 percent of media surface area of the media pack, and the second plurality of flutes comprises from 60 to 40 percent of the media surface area of the media pack.

10. The air filtration media pack of claim 1, wherein the first plurality of flutes comprises from 10 to 90 percent of the inlet face of the media pack, and the second plurality of flutes comprises from 90 to 10 percent of the inlet face of the media pack.

11. The air filtration media pack of claim 1, wherein the first plurality of flutes comprises from 20 to 40 percent of an inlet face of the media pack, and the second plurality of flutes comprises from 60 to 80 percent of the inlet face of the media pack.

12. The air filtration media pack of claim 2, wherein the first plurality of layers of filter media and the second plurality of layers of filter media are arranged in an intermixed configuration with one or more layers of the first plurality of layers alternating with one or more layers of the second plurality of layers.

13. The air filtration media pack of claim 1, further comprising a third plurality of flutes arranged in parallel flow with the first and second plurality of flutes.

14. The air filtration media pack of claim 13, wherein each of the first, second, and third pluralities of flutes is arranged in a separate plurality of layers.

15. The air filtration media pack of claim 13, wherein the first, second, and third plurality of flutes are arranged in an intermixed configuration with one more of the plurality of layers alternating with others of the plurality of layers.

16. The air filtration media pack of claim 1, wherein the plurality of layers media are arranged in a wound configuration.

17. The air filtration media pack of claim 1, wherein the differences in flute shape, flute size, flute height, flute width, cross-flute area or filter media are regular and repeating.

18. A filter element or air cleaner comprising the filtration media pack of claim 1.

19. A method of filtering a fluid stream, the method comprising passing a fluid stream through the air filtration media pack of claim 1.

* * * * *